United States Patent
Kim et al.

(10) Patent No.: US 10,499,452 B2
(45) Date of Patent: Dec. 3, 2019

(54) METHOD FOR DIRECT COMMUNICATION BETWEEN TERMINALS IN WIRELESS COMMUNICATION SYSTEM AND DEVICE THEREFOR

(71) Applicant: LG ELECTRONICS INC., Seoul (KR)

(72) Inventors: Taehun Kim, Seoul (KR); Sunghoon Jung, Seoul (KR); Laeyoung Kim, Seoul (KR); Jaehyun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/765,640

(22) PCT Filed: Oct. 26, 2016

(86) PCT No.: PCT/KR2016/012071
§ 371 (c)(1),
(2) Date: Apr. 3, 2018

(87) PCT Pub. No.: WO2017/074012
PCT Pub. Date: May 4, 2017

(65) Prior Publication Data
US 2019/0082495 A1    Mar. 14, 2019

Related U.S. Application Data

(60) Provisional application No. 62/257,725, filed on Nov. 20, 2015, provisional application No. 62/252,466, (Continued)

(51) Int. Cl.
*H04W 76/38*    (2018.01)
*H04W 36/00*    (2009.01)
(Continued)

(52) U.S. Cl.
CPC ....... *H04W 76/38* (2018.02); *H04W 36/0022* (2013.01); *H04W 48/16* (2013.01);
(Continued)

(58) Field of Classification Search
CPC . H04W 36/00; H04W 36/0022; H04W 48/16; H04W 76/02; H04W 76/06;
(Continued)

(56) References Cited

U.S. PATENT DOCUMENTS 9,237,478 B2 *  1/2016  Vannithamby .......... H04W 4/70
9,661,684 B2 *  5/2017  Siomina ................ H04W 72/02
(Continued)

FOREIGN PATENT DOCUMENTS

EP    2345299    8/2015
EP    3101969    12/2016
(Continued)

OTHER PUBLICATIONS

Qualcomm Incorporated, LG Electronics, "PC5 signalling protocol for one-to-one ProSe direct communication"; 3GPP TSG-CT WG1 Meeting #95, Qualcomm Incorporated, LG Electronics, Anaheim 'CA', USA, Nov. 16-20, 2015. (Year: 2015).*
(Continued)

*Primary Examiner* — Tri H Phan
(74) *Attorney, Agent, or Firm* — Lee, Hong, Degerman, Kang & Waimey

(57) ABSTRACT

Disclosed are a method for direct communication and a relay UE, the method including: in the process of configuring a direct communication with a remote UE, receiving, from the remote UE, a direct communication request message including information on a maximum inactivity period; starting a timer corresponding to the maximum inactivity period when data transmission or signaling via the direct connection with the remote UE is completed; and if no message is received
(Continued)

from the remote UE by the time the timer expires, locally releasing the direct connection with the remote UE.

10 Claims, 16 Drawing Sheets

Related U.S. Application Data filed on Nov. 7, 2015, provisional application No. 62/251,017, filed on Nov. 4, 2015, provisional application No. 62/249,955, filed on Nov. 3, 2015, provisional application No. 62/246,136, filed on Oct. 26, 2015.

(51) Int. Cl.

| | | |
|---|---|---|
| *H04W 48/16* | (2009.01) | |
| *H04W 76/14* | (2018.01) | |
| *H04W 76/27* | (2018.01) | |
| *H04W 76/28* | (2018.01) | |
| *H04W 88/04* | (2009.01) | |
| *H04W 76/10* | (2018.01) | |
| *H04W 76/30* | (2018.01) | |

(52) U.S. Cl.
CPC ........... *H04W 76/10* (2018.02); *H04W 76/14* (2018.02); *H04W 76/27* (2018.02); *H04W 76/28* (2018.02); *H04W 76/30* (2018.02); *H04W 88/04* (2013.01); *Y02D 70/00* (2018.01); *Y02D 70/10* (2018.01); *Y02D 70/12* (2018.01); *Y02D 70/126* (2018.01); *Y02D 70/1224* (2018.01); *Y02D 70/1226* (2018.01); *Y02D 70/1242* (2018.01); *Y02D 70/1262* (2018.01); *Y02D 70/1264* (2018.01); *Y02D 70/142* (2018.01); *Y02D 70/146* (2018.01); *Y02D 70/21* (2018.01)

(58) Field of Classification Search
CPC ................. H04W 76/10; H04W 76/14; H04W 76/27–28; H04W 76/30; H04W 76/38; H04W 88/04; H04W 92/18; Y02D 70/00; Y02D 70/10; Y02D 70/12; Y02D 70/21; Y02D 70/126; Y02D 70/142; Y02D 70/146; Y02D 70/1224; Y02D 70/1226; Y02D 70/1242; Y02D 70/1262; Y02D 70/1264

See application file for complete search history.

(56) References Cited

U.S. PATENT DOCUMENTS

| | | | | |
|---|---|---|---|---|
| 9,794,973 | B2* | 10/2017 | Kim | H04W 76/14 |
| 10,159,005 | B2* | 12/2018 | Siomina | H04W 52/0206 |
| 10,172,108 | B2* | 1/2019 | Lee | H04J 11/00 |
| 10,206,076 | B2* | 2/2019 | Chun | H04W 4/12 |
| 10,292,202 | B2* | 5/2019 | Loehr | H04W 72/042 |
| 2014/0133332 | A1 | 5/2014 | Lee | |
| 2014/0269555 | A1 | 9/2014 | Sadasivam et al. | |
| 2015/0296411 | A1* | 10/2015 | Meyer | G08G 1/0112 370/336 |
| 2016/0345313 | A1* | 11/2016 | Zhao | H04W 74/02 |
| 2018/0035308 | A1* | 2/2018 | Nguyen | H04W 76/14 |
| 2018/0220366 | A1* | 8/2018 | Bergstrom | H04W 76/28 |
| 2018/0295646 | A1* | 10/2018 | Faurie | H04W 72/085 |

FOREIGN PATENT DOCUMENTS

| | | |
|---|---|---|
| JP | 2010539800 | 12/2010 |
| KR | 10-2015-0100205 | 9/2015 |
| WO | 2010025774 | 3/2010 |
| WO | 2015037956 | 3/2015 |
| WO | 2015113398 | 8/2015 |
| WO | 2015019940 | 6/2016 |

OTHER PUBLICATIONS

PCT International Application No. PCT/KR2016/012071, Written Opinion of the International Searching Authority dated Jan. 17, 2017, 10 pages.
Intel Corporation, "Considerations on UE-to-NW Relay for ProSe," 3GPP TSG-RAN WG2 #89bis, R2-151111, Apr. 2015, 6 pages.
Qualcomm, et al., "PC5 signalling protocol for one-to-one ProSe direct communication", 3GPP TSG-CT WG1 Meeting #95, C1-154609, Nov. 2015, 27 pages.
Qualcomm, "PC5 signalling protocol for one-to-one ProSe direct communication", 3GPP TSG-CT WG1 Meeting #94, C1-153680, Oct. 2015, 20 pages.
Ericsson, "Establishment and release of the PC5 link between the Relay UE and the Remote UE", 3GPP TSG RAN WG2 Meeting #91bis, R2-154158, Oct. 2015, 5 pages.
European Patent Office Application Serial No. 16860195.3, Search Report dated Jun. 12, 2019, 7 pages.

* cited by examiner

FIG. 7
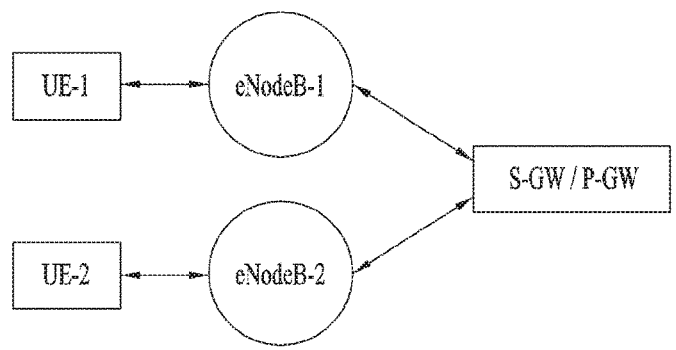
FIG. 8
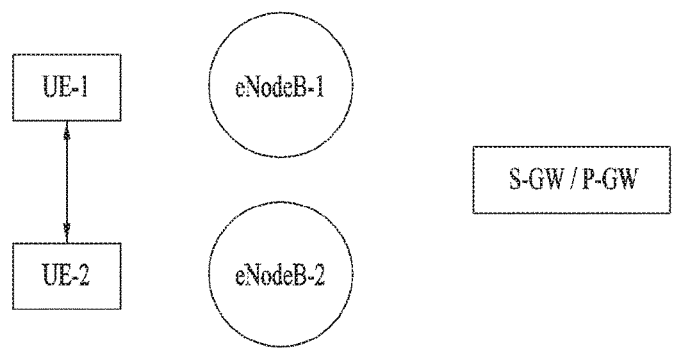
(a) UE-1 and UE-2 camp on different eNode B
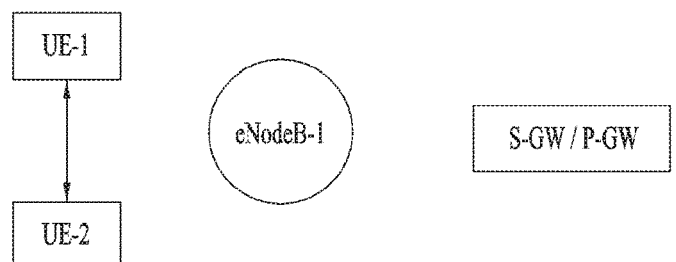
(b) UE-1 and UE-2 camp on same eNode B

METHOD FOR DIRECT COMMUNICATION BETWEEN TERMINALS IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2016/012071, filed on Oct. 26, 2016, which claims the benefit of U.S. Provisional Application No. 62/246,136, filed on Oct. 26, 2015, 62/249,955, filed on Nov. 3, 2015, 62/251,017, filed on Nov. 4, 2015, 62/252,466, filed on Nov. 7, 2015, and 62/257,725, filed on Nov. 20, 2015, the contents of which are all hereby incorporated by reference herein in their entirety.

TECHNICAL FIELD

Following description relates to a wireless communication system, and more particularly, to a method of performing direct communication between terminals to improve communication efficiency in direct communication (e.g., ProSe communication) between terminals and an apparatus therefor.

BACKGROUND ART

Wireless access systems have been widely deployed to provide various types of communication services such as voice or data. In general, a wireless access system is a multiple access system that may support communication of multiple users by sharing available system resources (e.g., a bandwidth, transmission power, etc.). For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a multi carrier frequency division multiple access (MC-FDMA) system.

DISCLOSURE OF THE INVENTION

Technical Tasks

An object of the present invention is to reduce a radio resource of a UE and unnecessary power consumption in a ProSe communication process.

Another object of the present invention is to propose new direct communication procedures between terminals to implement an efficient communication system.

The technical problems solved by the present invention are not limited to the above technical problems and other technical problems which are not described herein will become apparent to those skilled in the art from the following description.

Technical Solution

To achieve these and other advantages and in accordance with the purpose of the present invention, as embodied and broadly described, according to one embodiment, a method of performing a direct communication, which is performed by a relay UE corresponding to a ProSe-enabled UE (proximity service-enabled user equipment) with a remote UE in a wireless communication system, includes the steps of receiving a direct communication request message including information on a maximum inactivity period from the remote UE in a direct link setup procedure with the remote UE, if data transmission or signaling is completed via a direct link established with the remote UE, starting a timer corresponding to the maximum inactivity period, and if no message is received from the remote UE until the timer expires, locally releasing the direct link established with the remote UE.

If a data transmission or a signaling message is received from the remote UE before the timer expires, the relay UE stops the timer and can configure the timer with an initial value.

The maximum inactivity period can be determined in consideration of a transmission period of a direct communication keepalive message transmitted by the remote UE, a retransmission time interval, and a maximally allowed retransmission count.

The maximum inactivity period can be determined according to an equation described in the following. [Equation] 'Inactivity timerkeep'≥'transmission period of keepalive message'+'retransmission time interval'*'maximum number of allowed retransmissions' In this case, the 'Inactivity timerkeep' corresponds to the maximum inactivity period, the 'transmission period of keepalive message' corresponds to a transmission period of the direct communication keepalive message, the 'retransmission time interval' corresponds to a retransmission time interval of the direct communication keepalive message, and the 'maximum number of allowed retransmissions' corresponds to a maximally allowed retransmission count of the direct communication keepalive message.

If a direct communication keepalive message including information on a new maximum inactivity period is received from the remote UE after the direct communication request message is received, the timer can be configured according to the information on the new maximum inactivity period.

The maximum inactivity period relates to a transmission pattern of a direct communication keepalive message transmitted by the remote UE and the transmission pattern of the direct communication keepalive message can be determined in consideration of at least one selected from the group consisting of mobility, a reporting type, and a message transmission pattern of the remote UE.

Only the remote UE can transmit a direct communication keepalive message among the relay UE and the remote UE.

To further achieve these and other advantages and in accordance with the purpose of the present invention, according to a different embodiment, a relay UE corresponding to a ProSe-enabled UE (proximity service-enabled user equipment) performing direct communication with a remote UE in a wireless communication system includes a transmitting unit, a receiving unit, and a processor configured to operate in a manner of being connected with the transmitting unit and the receiving unit, the processor configured to receive a direct communication request message including information on a maximum inactivity period from the remote UE in a direct link setup procedure with the remote UE, the processor, if data transmission or signaling is completed via a direct link established with the remote UE, configured to start a timer corresponding to the maximum inactivity period, the processor, if no message is received from the remote UE until the timer expires, configured to locally release the direct link established with the remote UE.

Advantageous Effects

As is apparent from the above description, the embodiments of the present invention have the following effects.

First of all, when direct communication is performed between UEs, since unnecessary signaling is reduced, it is able to reduce the waste of a radio resource and power consumption of a UE.

Second, it is able to enhance communication efficiency by proposing parts which were not previously defined in a direct communication procedure between UEs and signaling.

Third, it is able to enhance a legacy communication scheme by proposing various embodiments to overall procedures of direct communication between UEs.

The effects of the present invention are not limited to the above-described effects and other effects which are not described herein may be derived by those skilled in the art from the following description of the embodiments of the present invention. That is, effects which are not intended by the present invention may be derived by those skilled in the art from the embodiments of the present invention.

DESCRIPTION OF DRAWINGS

The accompanying drawings, which are included to provide a further understanding of the invention, illustrate embodiments of the invention and together with the description serve to explain the principle of the invention. The technical features of the present invention are not limited to specific drawings and the features shown in the drawings are combined to construct a new embodiment. Reference numerals of the drawings mean structural elements.

FIG. 7 illustrates a basic path for communication between two UEs in the EPS;

FIG. 8 illustrates a ProSe-based direct-mode communication path between two UEs;

BEST MODE

Mode for Invention

Figure 1:
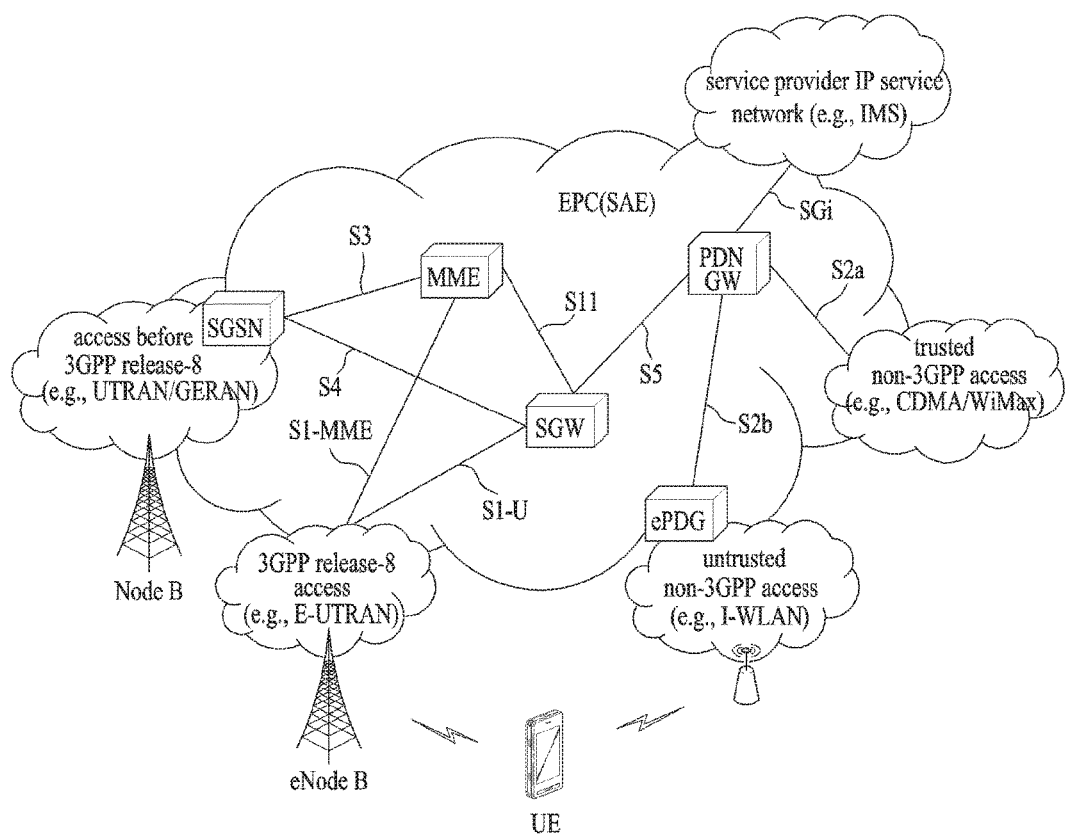
FIG. 1 is a diagram illustrating a brief structure of an EPS (evolved packet system) that includes an EPC (evolved packet core)

Although the terms used in the present invention are selected from generally known and used terms, terms used herein may be varied depending on operator's intention or customs in the art, appearance of new technology, or the like. In addition, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

In describing the present invention, if it is determined that the detailed description of a related known function or construction renders the scope of the present invention unnecessarily ambiguous, the detailed description thereof will be omitted.

In the entire specification, when a certain portion "comprises or includes" a certain component, this indicates that the other components are not excluded and may be further included unless specially described otherwise. The terms "unit", "-or/er" and "module" described in the specification indicate a unit for processing at least one function or operation, which may be implemented by hardware, software or a combination thereof. The words "a or an", "one", "the" and words related thereto may be used to include both a singular expression and a plural expression unless the context describing the present invention (particularly, the context of the following claims) clearly indicates otherwise.

The embodiments of the present invention can be supported by the standard documents disclosed in any one of wireless access systems, such as an IEEE 802.xx system, a 3rd Generation Partnership Project (3GPP) system, a 3GPP Long Term Evolution (LTE)/LTE-Advanced (LTE-A) system, and a 3GPP2 system. That is, the steps or portions, which are not described in order to make the technical spirit of the present invention clear, may be supported by the above documents.

In addition, all the terms disclosed in the present document may be described by the above standard documents. In particular, the embodiments of the present invention may be supported by at least one of P802.16e-2004, P802.16e-2005, P802.16.1, P802.16p and P802.16.1b documents, which are the standard documents of the IEEE 802.16 system.

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment which the present invention can be carried out.

It should be noted that specific terms disclosed in the present invention are proposed for convenience of description and better understanding of the present invention, and the use of these specific terms may be changed to another format within the technical scope or spirit of the present invention.

Terms used in the specification are defined as follows.

UMTS (Universal Mobile Telecommunications System): a GSM (Global System for Mobile Communication) based third generation mobile communication technology developed by the 3GPP.

EPS (Evolved Packet System): a network system that includes an EPC (Evolved Packet Core) which is an IP (Internet Protocol) based packet switched core network and an access network such as LTE and UTRAN. This system is the network of an evolved version of the UMTS.

NodeB: a base station of GERAN/UTRAN. This base station is installed outdoor and its coverage has a scale of a macro cell.

eNodeB: a base station of LTE. This base station is installed outdoor and its coverage has a scale of a macro cell.

UE (User Equipment): the UE may be referred to as terminal, ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The term "UE", as used in relation to MTC, can refer to an MTC device.

HNB (Home NodeB): a base station of UMTS network. This base station is installed indoor and its coverage has a scale of a micro cell.

HeNB (Home eNodeB): a base station of an EPS network. This base station is installed indoor and its coverage has a scale of a micro cell.

MME (Mobility Management Entity): a network node of an EPS network, which performs mobility management (MM) and session management (SM).

PDN-GW (Packet Data Network-Gateway)/PGW/P-GW: a network node of an EPS network, which performs UE IP address allocation, packet screening and filtering, charging data collection, etc.

SGW (Serving Gateway/S-GW: a network node of an EPS network, which performs mobility anchor, packet routing, idle-mode packet buffering, and triggering of an MME's UE paging.

PCRF (Policy and Charging Rule Function): a network node of an EPS network, which performs a policy decision to dynamically apply different QoS and charging policies for each service flow.

OMA DM (Open Mobile Alliance Device Management): a protocol designed to manage mobile devices such as a cell phone, a PDA, and a laptop computer, which performs functions such as device configuration, firmware upgrade, error report, and the like.

OAM (Operation Administration and Maintenance): a set of network management functions, which provides network error display, performance information, data, and management functions.

NAS (Non-Access Stratum): a higher stratum of a control plane between a UE and MME. As a functional layer for exchanging signaling and traffic messages between a UE and core network in LTE/UMTS protocol stack, the NAS supports UE mobility, a session management procedure for establishing and maintaining an IP connection between a UE and PDN GW, and IP address management.

AS (Access-Stratum): the AS includes a protocol stack between a UE and a radio (or access) network, which manages transmission of data and network control signals.

NAS configuration MO (Management Object): the NAS configuration MO is a management object (MO) used to configure parameters related to NAS functionality for a UE.

PDN (Packet Data Network): a network in which a server supporting a specific service (e.g., a Multimedia Messaging Service (MMS) server, a Wireless Application Protocol (WAP) server, etc.) is located.

PDN connection: a logical connection between a UE and a PDN, represented as one IP address (one IPv4 address and/or one IPv6 prefix).

APN (Access Point Name): a character string for indicating or identifying PDN. To access a requested service or network, a connection to a specific P-GW is required. The APN means a name (character string) predefined in a network to search for the corresponding P-GW (for example, it may be defined as internet.mnc012.mcc345.gprs).

RAN (Radio Access Network): a unit including a Node B, an eNode B, and a Radio Network Controller (RNC) for controlling the Node B and the eNode B in a 3GPP network, which is present between UEs and provides a connection to a core network.

HLR (Home Location Register)/HSS (Home Subscriber Server): a database having subscriber information in a 3GPP network. The HSS can perform functions such as configuration storage, identity management, and user state storage.

PLMN (Public Land Mobile Network): a network configured for the purpose of providing mobile communication services to individuals. This network can be configured per operator.

ANDSF (Access Network Discovery and Selection Function): This is one of network entities for providing a policy for discovering and selecting an access that can be used by a UE on an operator basis.

Proximity Services (or ProSe Service or Proximity-based Service): a service that enables discovery between physically proximate devices, and mutual direct communication/communication through a base station/communication through the third party. At this time, user plane data are exchanged through a direct data path without through a 3GPP core network (for example, EPC).

ProSe Communication: communication between two or more ProSe-enabled UEs in proximity by means of a ProSe Communication path. Unless explicitly stated otherwise, the term "ProSe Communication" refers to any/all of the following: ProSe E-UTRA Communication, ProSe-assisted WLAN direct communication between two UEs, ProSe Group Communication and ProSe Broadcast Communication.

ProSe E-UTRA Communication: ProSe Communication using a ProSe E-UTRA Communication path.

ProSe-assisted WLAN direct communication: ProSe Communication using a ProSe-assisted WLAN direct communication path.

ProSe Communication path: communication path supporting ProSe Communication. The ProSe E-UTRA Communication path could be established between the ProSe-enabled UEs using E-UTRA, or routed via local eNB(s). The ProSe-assisted WLAN direct communication path may be established directly between the ProSe-enabled UEs using WLAN.

EPC Path (or infrastructure data path): the user plane communication path through EPC.

ProSe Discovery: a process that identifies that a UE that is ProSe-enabled is in proximity of another, using E-UTRA.

ProSe Group Communication: one-to-many ProSe Communication, between more than two ProSe-enabled UEs in proximity, by means of a common communication path established between the ProSe-enabled UEs.

ProSe UE-to-Network Relay: is a form of relay in which a ProSe-enabled Public Safety UE acts as a communication relay between a ProSe-enabled Public Safety UE and the ProSe-enabled network using E-UTRA.

Remote UE: This is a ProSe-enabled Public Safety UE that is connected to an EPC network through a ProSe UE-to-network relay instead of being served by an E-UTRAN in UE-to-Network Relay operation. That is, a PDN connection is provided to the remote UE.

ProSe-enabled Network: a network that supports ProSe Discovery, ProSe Communication and/or ProSe-assisted WLAN direct communication. Hereinafter, the ProSe-enabled Network may simply be referred to as a network.

ProSe-enabled UE: a UE that supports ProSe Discovery, ProSe Communication and/or ProSe-assisted WLAN direct communication. Hereinafter, the ProSe-enabled UE and the ProSe-enabled Public Safety UE may be referred to as UE.

Proximity: proximity is determined ("a UE is in proximity of another UE") when given proximity criteria are fulfilled. Proximity criteria can be different for discovery and communication.

1. Evolved Packet Core (EPC)

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, in 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between an MME and an SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
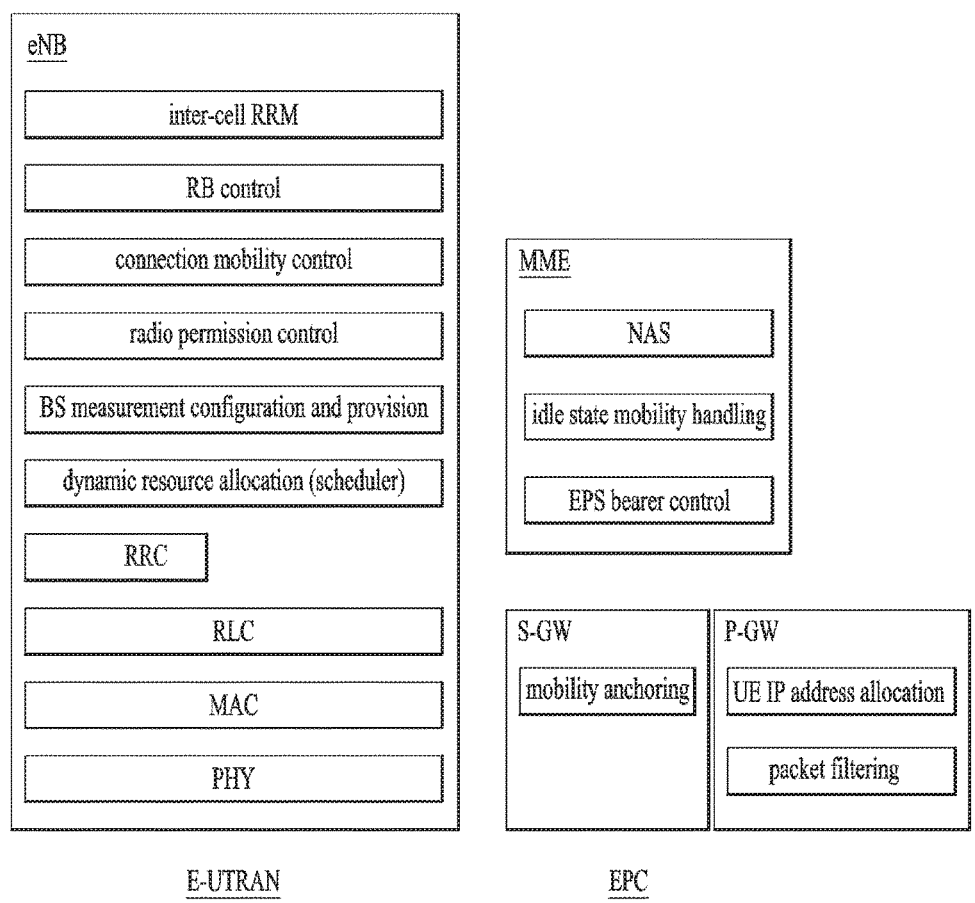
FIG. 2 is an exemplary diagram illustrating an architecture of a general E-UTRAN and a general EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
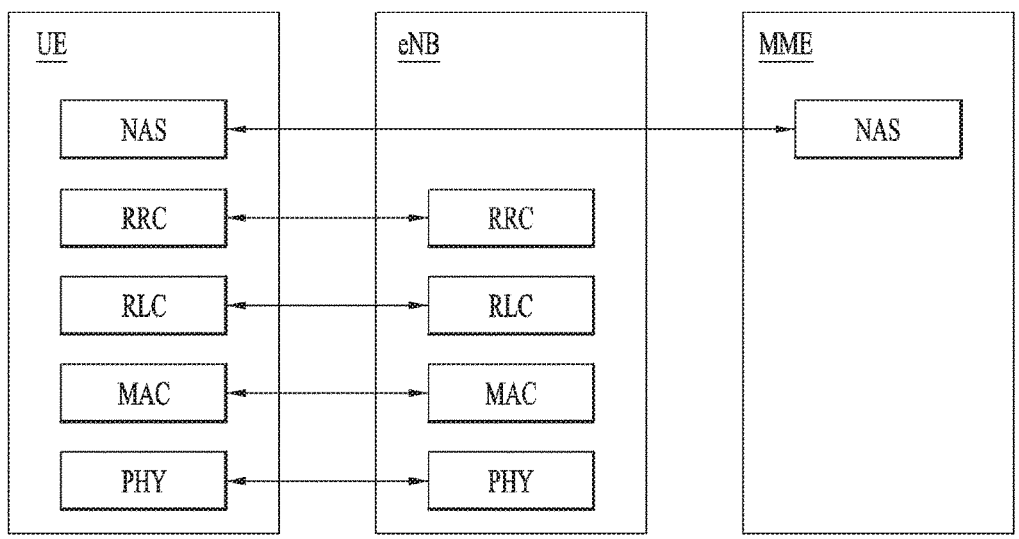
FIG. 3 is an exemplary diagram illustrating a structure of a radio interface protocol on a control plane.
Figure 4:
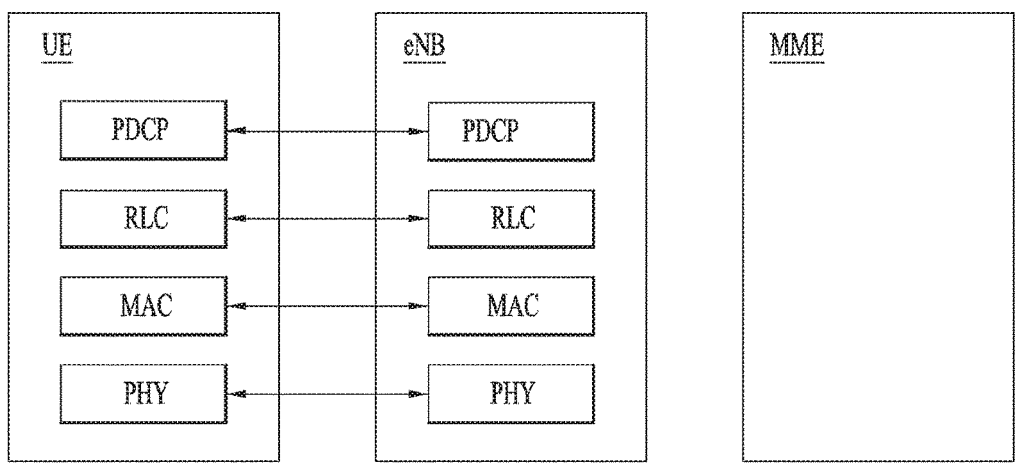
FIG. 4 is an exemplary diagram illustrating a structure of a radio interface protocol on a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel Data is transferred between the physical layer and the MAC layer through the transport channel Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of OFDM symbols in the time domain and a plurality of subcarriers. One subframe consists of a plurality of resource blocks. One resource block consists of a plurality of OFDM symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers. First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The ESM (evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
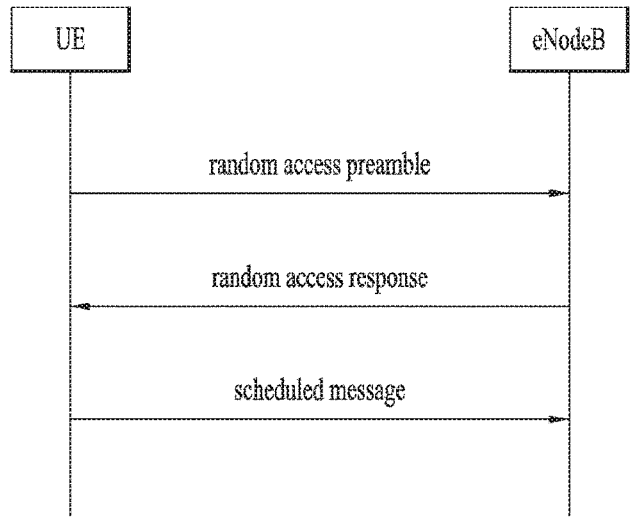
FIG. 5 is a flow chart illustrating a random access procedure.

FIG. 5 is a flowchart illustrating a random access procedure in 3GPP LTE.

The random access procedure is performed for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
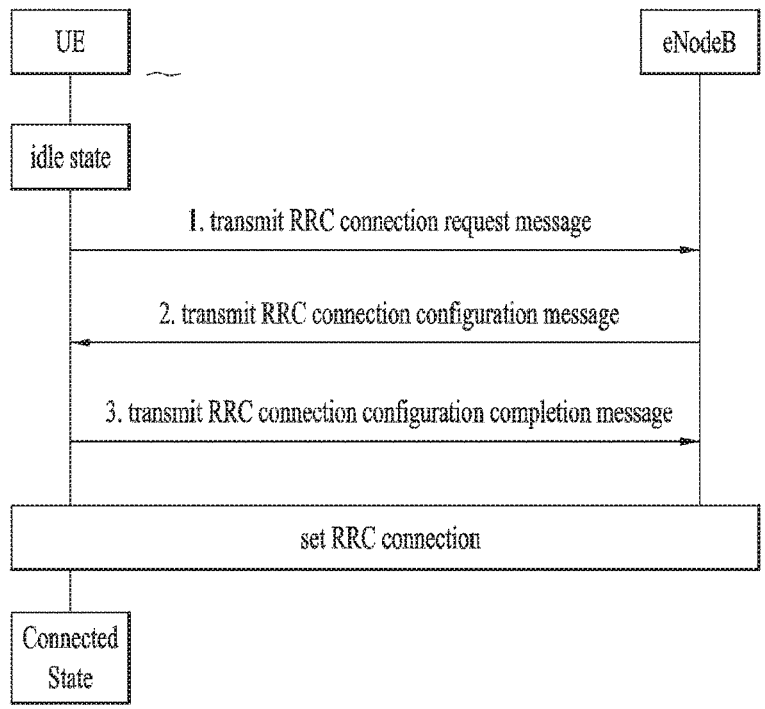
FIG. 6 is a diagram illustrating a connection procedure in a radio resource control (RRC) layer.

FIG. 6 illustrates a connection procedure in a radio resource control (RRC) layer.

As shown in FIG. 6, the RRC state is set according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, the UE establishes RRC connection with the RRC layer of the eNodeB through the RRC connection procedure and then performs transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

1) When the UE in the idle state desires to establish RRC connection for reasons such as an attempt to make a call, a data transmission attempt, or a response of the eNodeB to paging, the UE transmits an RRC connection request message to the eNodeB first.

2) Upon receiving the RRC connection request message from the UE, the ENB accepts the RRC connection request of the UE when the radio resources are sufficient, and then transmits an RRC connection setup message, which is a response message, to the UE.

3) Upon receiving the RRC connection setup message, the UE transmits an RRC connection setup complete message to the eNodeB. Only when the UE successfully transmits the RRC connection setup message, does the UE establish RRC connection with the eNodeB and transition to the RRC connected mode.

2. ProSe (Proximity Service)

As described above, ProSe service means a service that enables discovery between physically proximate devices and mutual direct communication, communication through a base station or communication through a third device.

FIG. 7 illustrates a default data path through which two UEs perform communication with each other in an EPS. This default data path passes through an eNodeB and a core network (i.e., EPC), which are managed by an operator. In the present invention, this path will be referred to as an infrastructure data path (or EPC path). Also, communication through this infrastructure data path will be referred to as infrastructure communication.

FIG. 8 illustrates a direct mode data path between two UEs based on ProSe. This direct mode communication path does not pass through the eNodeB and the core network (i.e., EPC), which are managed by an operator. FIG. 8(a) illustrates a case that UE-1 and UE-2 are camping on different eNodeBs and exchange data through a direct mode communication path. FIG. 8(b) illustrates a case that two UEs are camping on the same eNodeB and exchange data through a direct mode communication path.

Figure 9:
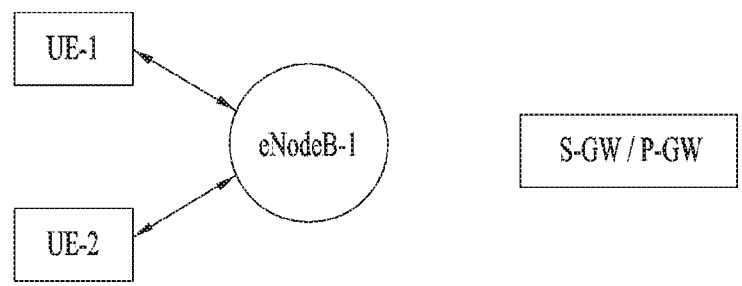
FIG. 9 illustrates a ProSe-based communication path between two UEs through an eNode B.

FIG. 9 illustrates a locally routed data path through eNodeB between two UEs based on ProSe. This communication path through eNodeB does not pass through a core network (i.e., EPC) managed by an operator.

Figure 10:
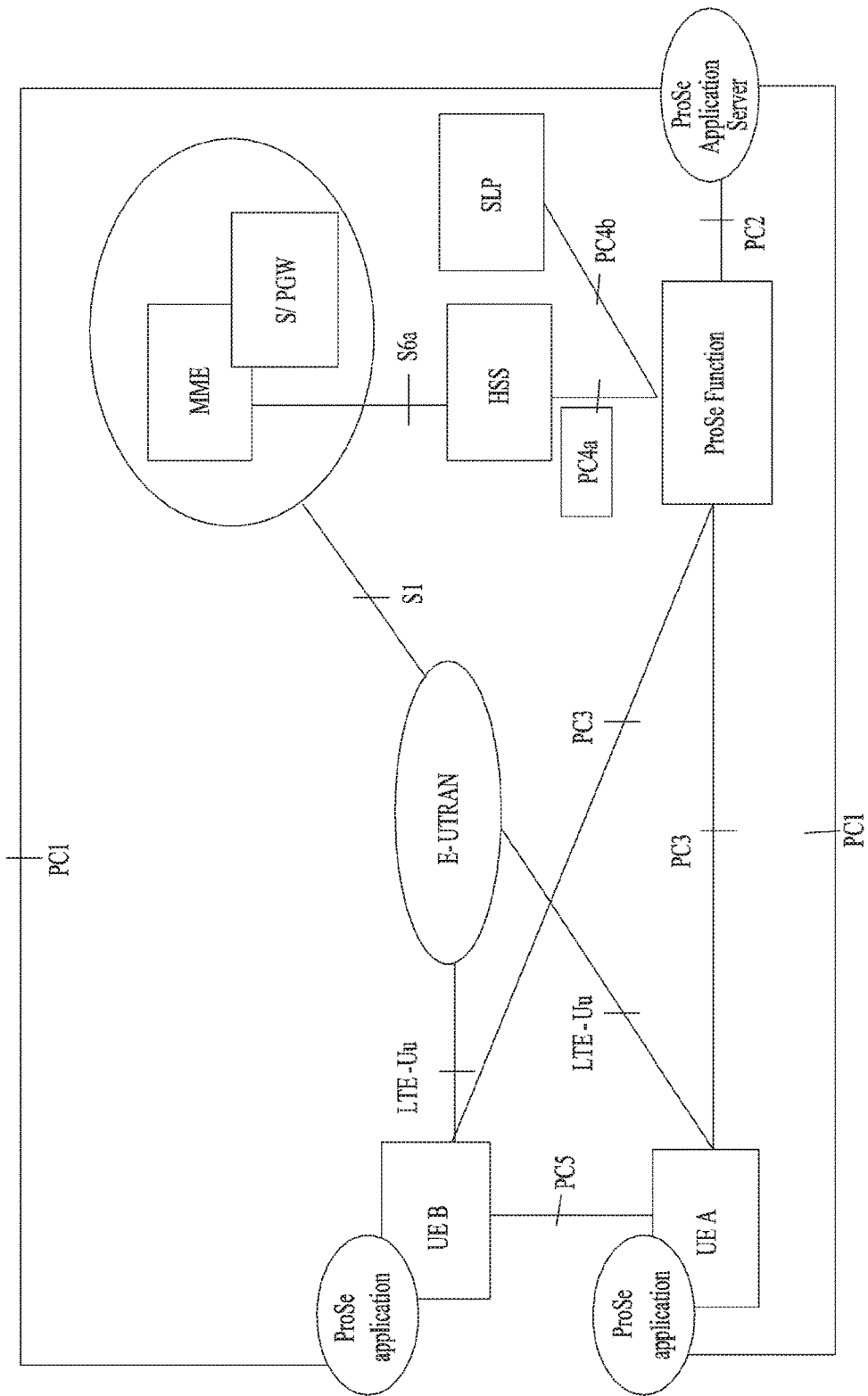
FIG. 10 illustrates a non-roaming reference architecture.

A non-roaming reference architecture is shown in FIG. 10. In the structure of FIG. 10, the EPC may determine proximity of two UEs and perform an EPC-level ProSe discovery procedure to notify the UE of the determined result. For this EPC-level ProSe discovery, a ProSe Function serves to determine proximity of two UEs and notify the UE of the determined result.

The ProSe function may retrieve and store ProSe associated subscriber data and/or ProSe associated subscriber data from HSS, and perform authentication and configuration for EPC level ProSe discovery and EPC sub WLAN direct discovery communication. Also, the ProSe function may be operated as a location service client that enables EPC level discovery, and may provide the UE of information for assisting WLAN direct discovery and communication. The ProSe function handles EPC ProSe User IDs and Application Layer User ID, and exchanges a signal with a third party application server for application registration identifier mapping. For transmission of a proximity request, proximity alerts and location report, the ProSe function exchanges a signal with a ProSe function of other PLMNs. In addition, the ProSe function provides various parameters required for ProSe discovery and ProSe communication. Details of the ProSe function are based on 3GPP TS 23.303.

Figure 11:
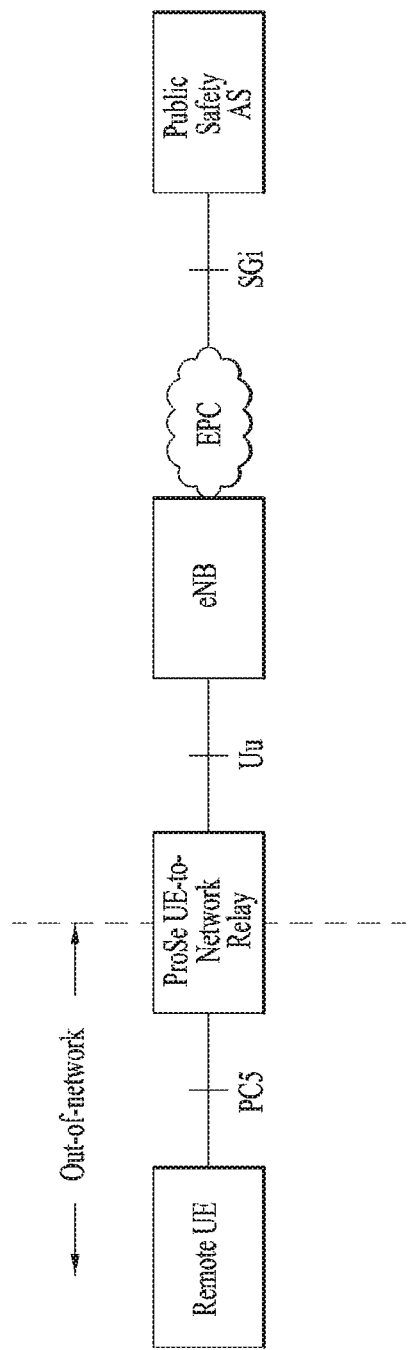
FIG. 11 is a diagram illustrating communication through a Prose UE-to-Network Relay.
Figure 12:
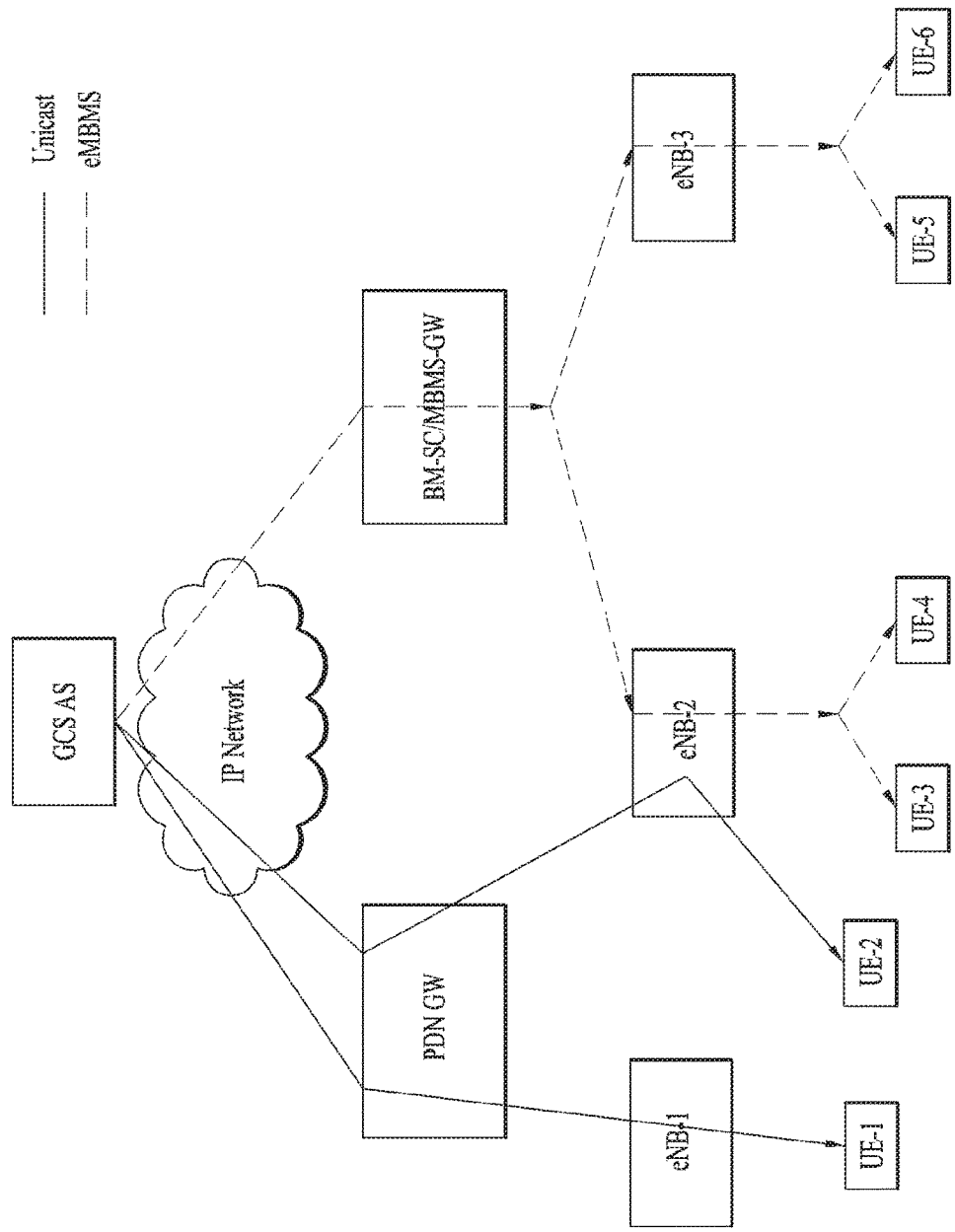
FIG. 12 is a diagram illustrating media traffic of group communication.

FIG. 11 illustrates communication through a ProSe UE-to-Network Relay. When a remote UE has connectivity to an EPC through a UE-to-network relay, the remote UE can communicate with an application server (AS) or participate in group communication. FIG. 12 shows an example in which a remote UE participate in group communication. UE-1 to UE-6 which are UEs belonging to the same group in FIG. 12 may receive downlink traffic through unicast or MBMS for specific media that configure group communication. As a result, although not in E-UTRAN coverage, the remote UE may transmit media traffic to other group members (that is, generate uplink traffic) by joining group communication through the UE-to-Network Relay or receive media traffic transmitted from other group members. In FIG. 12, a GCS AS (Group Communication Service Application Server) may serve to i) exchange GC1 signalling, ii) receive uplink data from a unicast UE, iii) transfer data to all UEs, which belong to a group, by using Unicast/MBMS delivery, iv) transmit application level session information through Rx interface to a PCRF, and v) support a service continuity procedure for a UE which is switched between Unicast Delivery and MBMS Delivery. The GCS AS, Public Safety AS, and GCSE AS (Group Communication Service Enabler Application Server) may be interpreted to refer to the same meaning and include AS that controls/manages communication joined by a plurality of UEs. Details of group communication is based on TS 23.468.

Figure 13:
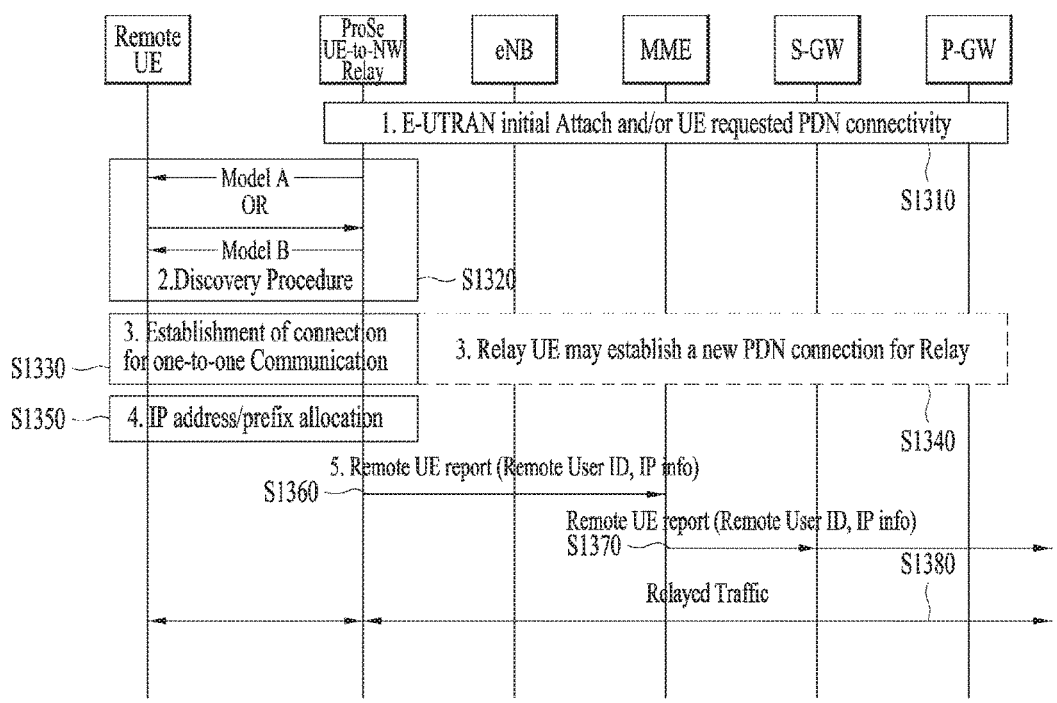
FIG. 13 is a diagram illustrating a procedure in which a remote UE performs direct communication through a UE-to-network relay.

FIG. 13 illustrates a procedure in which a remote UE that is not served by an E-UTRAN performs direct communication through a UE-to-network relay. A UE capable of operating as a ProSe UE-to-network relay may establish a PDN connection to provide relay traffic to the remote UE by accessing the network. The PDN connection supporting the UE-to-network relay is used only to provide the relay traffic to the remote UE.

First, a relay UE establishes a PDN connection through initial access to an E-UTRAN [S1310]. In the case of IPv6, the relay UE obtains an IPv6 prefix using a prefix delegation function. Next, the relay UE performs a discovery procedure, which differs depending on either Model A or Model B, together with a relay UE [S1320]. The remote UE selects the relay UE discovered through the discovery procedure and then establishes one-to-one direct connection [S1330]. If there is no PDN connection associated with a relay UE ID or if an additional PDN connection for relay operation is required, the relay UE initiates a new PDN connection procedure [S1340].

Next, an IPv6 prefix or an IPv4 address is allocated to the remote UE [S1350], and then uplink/downlink relay operation is initiated. When the IPv6 prefix is allocated, an IPv6 stateless address auto-configuration procedure configured with router solicitation signaling from the remote UE to the relay UE and router advertisement signaling from the relay UE to the remote UE is initiated. On the other hand, when the IPv4 address is allocated, an IPv4 address allocation using DHCPv4 procedure configured with DHCPv4 discovery signaling (from the remote UE to the relay UE), DHCPv4 offer signaling (from the relay UE to the remote UE), DHCPv4 request signaling (from the remote UE to the relay UE), and DHCPv4 ACK signaling (from the relay UE to the remote UE) is initiated.

Thereafter, the relay UE performs a Remote UE Report procedure for informing an MME that the relay UE is connected to the remote UE [S1360]. The MME performs a Remote UE Report Notification procedure to inform an SGW and a PGW that the new remote UE is connected [S1370]. Then, the remote UE performs communication with the network through the relay UE [S1380]. Details of the direct connection generation procedure could be found in TS 23.303.

3. Proposed Method for Performing Direct Communication Between UEs

Figure 14:
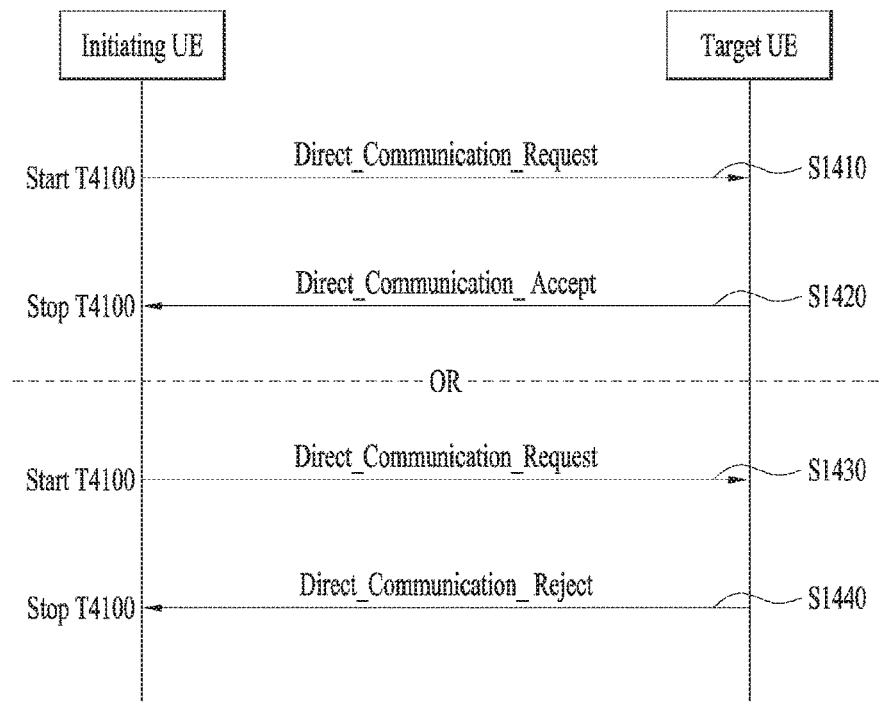
FIGS. 14 to 16 are flowcharts for direct communication signaling procedures between UEs according to a proposed embodiment.
Figure 15:
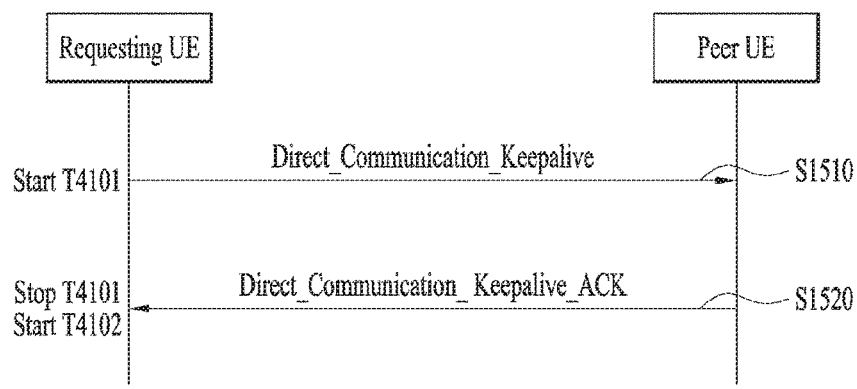
Figure 16:
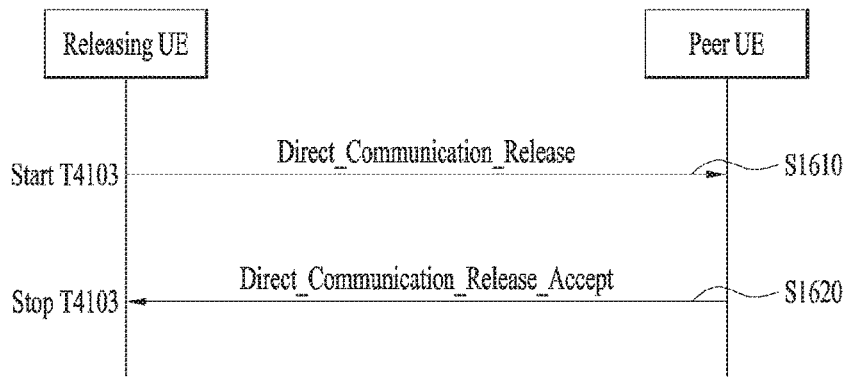

FIGS. 14 to 16 are flowcharts for direct communication signaling procedures between UEs according to a proposed embodiment. FIG. 14 illustrates a procedure of establishing a direct link between a remote UE and a relay UE and a signaling message used for the procedure, FIG. 15 illustrates a procedure after the direct link is established between the remote UE and the relay UE and a signaling message used for the procedure, and FIG. 16 illustrates a procedure of releasing the direct link between the remote UE and the relay UE and a signaling message used for the procedure.

FIG. 14 is explained first. If a target UE is discovered via a discovery procedure according to the Model A or the Model B, a UE (initiating UE) initiating a direct link configuration transmits a direct communication request message to the target UE [S1410, S1430]. If the target UE is able to configure a direction link with the initiating UE, the target UE transmits a direct communication accept message to the initiating UE in response to the direct communication request message [S1420]. On the contrary, if the target UE is unable to configure a direction link with the initiating UE, the target UE transmits a direct communication reject message to the initiating UE [S1440]. In the abovementioned procedure, when the initiating UE transmits the direct communication request message, the initiating UE can start a timer T4100 at the same time. The timer T4100 is terminated when a response is received from the target UE. If a response is not received until the timer expires, the initiating UE can retransmit the message to the target UE.

Subsequently, FIG. 15 is explained. When a direct link is established between two UEs (e.g., a remote UE and a relay UE) via the procedure mentioned earlier in FIG. 14, the two UEs perform D2D (device-to-device) direct communication via the direct link. Meanwhile, while a data packet is not transmitted and received via the direct link, in order to check whether or not the direct link is valid and maintain the direct link, a direct communication keepalive message can be transceived between the two UEs. A requesting UE directly transmits the direct communication keepalive message to a peer UE [S1510]. A timer T4101 may start at the time of transmitting the direct communication keepalive message. Having received the direct communication keepalive message, the peer UE directly transmits a direct communication keepalive ACK message to the requesting UE in response to the direct communication keepalive message [S1520]. Having received the direct communication keepalive ACK message, the requesting UE stops the timer T4101 and starts a new timer T4102. The T4101 timer corresponds to a timer for determining whether to transmit the direct communication keepalive message and the T4102 timer corresponds to a timer for determining the timing at which a new direct communication keepalive message is to be transmitted.

FIG. 16 illustrates a procedure of releasing a direct link. If a UE determines to release a direct link, the UE becomes a releasing UE and transmits a direct communication release message to a peer UE [S1610, S1630]. Having received the direct communication release message, the peer UE transmits a direct communication release accept message to the releasing UE in response to the direct communication release message [S1620]. A timer T4103 may start at the time of transmitting the direct communication release message. The timer T4103 is terminated when the direct communication release accept message is received.

In the following, problems capable of being occurred in the procedures mentioned earlier in FIGS. 14 to 16 are described.

First of all, a problem may occur when an initiating UE receives a reject message in a direct link establishing procedure. In a Model A discovery procedure, a relay UE, which has established a direct link with one or more remote UEs, continuously transmits a discovery message. In this case, if a third party remote UE receives the discovery message from the relay UE, the third party remote UE can transmit a direct communication request message to the relay UE. In this case, since the relay UE does not want to communicate with the third party remote UE, the relay UE transmits a direct communication reject message to the third party remote UE. The direct communication reject message includes a reject cause. If an initiating UE receives the reject message, a problem may occur in a specific operation of the initiating UE. In particular, when a remote UE receives a reject message and selects/reselects a relay, a procedure of making the remote UE not to reselect a corresponding relay UE is required. And, it is necessary to determine whether a reject cause included in the reject message corresponds to a temporal reject cause or a permanent reject cause. Moreover, it is necessary to define an operation of a remote UE in detail according to each reject cause. The abovementioned problem also occurs when a relay UE, which has received a PC5 discovery request message, fails to specify a remote UE.

Second, when an initiating UE transmits a direct communication request message to a target UE, if a new relay is discovered before an accept response or a reject response is received from the target UE, a problem may occur. As mentioned in the foregoing description, the initiating UE starts a timer T4100 at the time of transmitting a direct communication request message. Meanwhile, a discovery procedure can be simultaneously performed irrespective of a direct link establishing procedure which is in progress. If a better relay UE (i.e., a target UE) is discovered by a new discovery procedure before the initiating UE receives a response in response to the direct communication request message, it is necessary to define an operation in detail.

Third, when a direct link is established, a problem may occur in a procedure of releasing the direct link as well. Currently, when a relay UE transmits a direct link release message to a remote UE, since the remote UE does not have any specific definition on the direct link release message, a problem may occur. When the relay UE transmits a release cause to the remote UE together with the direct link release message, it is necessary to define a specific operation of the remote UE. In particular, it is important to define the operation to prevent the remote UE from reselecting the relay UE. Similar to the contents mentioned earlier in the first problem, it is necessary to determine an operation of a remote UE according to a temporal release cause and a permanent release cause.

Fourth, when a remote UE and a relay UE communicate with each other via an established direct link, there is a problem in determining an entity of transmitting a direct communication keepalive message among the remote UE and the relay UE. According to current TS 24.334, although it is simply described as a requesting UE transmits a direct communication keepalive message, a UE playing a role of the requesting UE has not been described yet. When a remote UE and a relay UE communicate with each other in a manner of being connected by one-to-one, if an entity of transmitting a corresponding message is not determined, both of the remote UE and the relay UE may transmit a keepalive message. In this case, it may cause signaling overhead and lead to unnecessary radio resource waste. Moreover, a burden of matching transmission timing between two UEs occurs as well.

Fifth, when a direct communication keepalive message is transmitted, if a requesting UE does not receive a response, a problem may occur. It is necessary to solve the problem as well. When an initiating UE transmits a direct communication request message, if the initiating UE does not receive a response, the abovementioned problem may occur as well. In particular, if a timer, which has started at the time of transmitting the two messages, expires, the initiating UE/requesting UE retransmits a message. In this case, since an operation after the maximum number of retransmissions has not been defined yet, a problem may occur. If quality of a communication link is degraded, although retransmission is repetitively performed, it may fail to receive a response. In this case, although it is not necessary to maintain the communication link, if the communication link is continuously maintained, a problem of continuously occupying a radio channel may occur. It is necessary to solve the problem.

Sixth, it may consider a case that the releasing UE mentioned earlier in FIG. 16 fails to receive a response from a peer UE after a direct connection release message is transmitted. According to the current spec, there is no description on the abovementioned case. In this situation, the releasing UE repetitively retransmits a release message to the peer UE until a release accept message is received from the peer UE. As a result, unnecessary signaling is repetitively performed.

Seventh, when a remote UE selects/reselects a relay UE, a problem may occur in selecting a triggering condition and a candidate of a target UE. In particular, according to TS 24.334, since a triggering condition for a relay selection/reselection procedure and a procedure of selecting a candidate of a target UE have not been specifically defined yet, a problem may occur.

FIGS. 17 to 20 are flowcharts for direct communication methods between UEs according to a proposed embodiment. In the following, an embodiment for enhancing PC5 signaling messages and an embodiment for improving a signaling procedure are explained, respectively. An embodiment for solving the aforementioned first and the second problems is explained in FIG. 17, an embodiment for solving the third problem is explained in FIG. 18, an embodiment for solving the fourth and fifth problems is explained in FIG. 19, and an embodiment for solving the sixth problem is explained in FIG. 20. An embodiment for solving the seventh problem is explained in summary. In the following description, such a terminology as 'back-off timer' or 'timer' is used over a plurality of embodiments. In this case, although a specific name of a timer is not defined nor explained, it may indicate a timer of a different type according to an embodiment and a usage of the timer.

3.1 Embodiment 1

Figure 17:
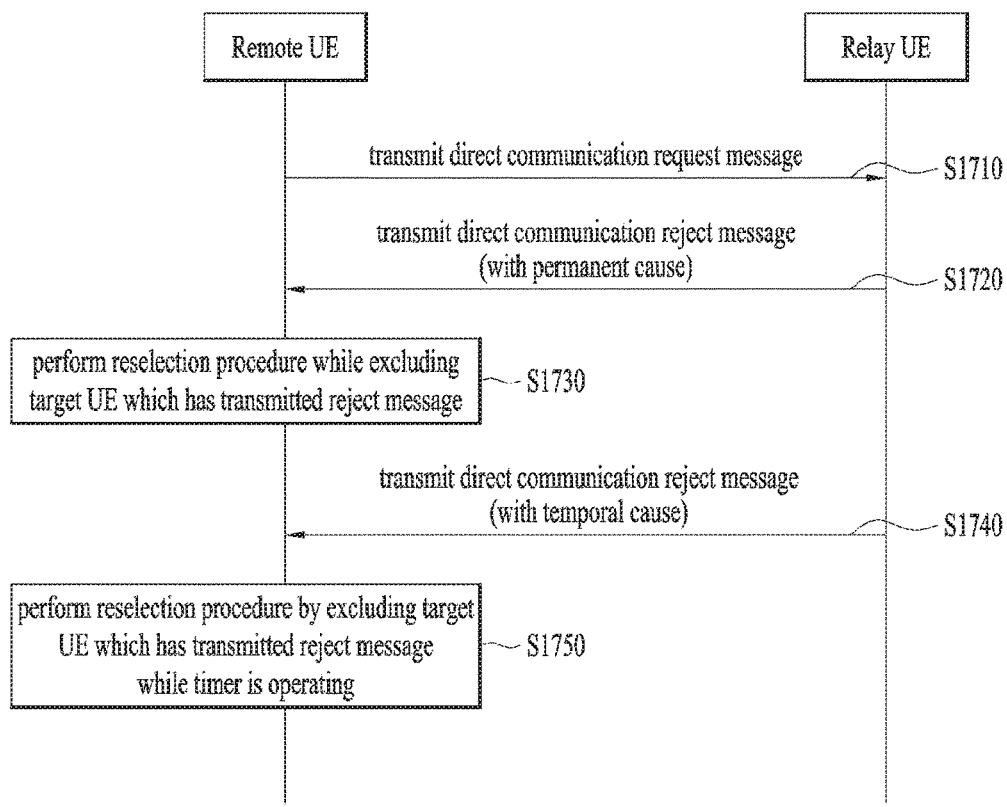
FIGS. 17 to 20 are flowcharts for direct communication methods between UEs according to a proposed embodiment.

First of all, an embodiment for solving the first and the second problems is explained with reference to FIG. 17. In particular, when an initiating UE receives a direct communication request reject message, if the initiating UE reselects a corresponding target UE, a problem occurs. In FIG. 17, an embodiment for preventing the problem is proposed.

When a target UE (or, a relay UE) transmits a reject message in response to a direct communication request message transmitted by an initiating UE (or, a remote UE), '#1: direct communication to target UE not allowed' has been previously defined as a reject cause.

First of all, a method of preventing reselection of a target UE using a single reject cause is explained. If a direct communication reject message including the abovementioned reject cause #1 or a newly defined reject cause is received, an initiating UE may operate in two types. As a first type, the initiating UE includes a target UE, which has transmitted the direct communication reject message, in a forbidden UE list for link setup. The UE included in the forbidden UE list is excluded not only from a link setup procedure but also from a discovery procedure.

Second, it may consider a method of operating a back-off timer. In particular, if an initiating UE receives a reject message, the initiating UE starts a prescribed back-off timer. A value of the back-off timer can be transmitted to the initiating UE in a manner of being included in the direct communication reject message or can be configured in the initiating UE in advance. If the value of the back-off timer is transmitted to the initiating UE in a manner of being included in the direct communication reject message, the received value is used instead of the value configured to the initiating UE in advance. The initiating UE does not perform a link setup procedure on the UE, which has transmitted the reject message, while the back-off timer is operating and excludes the UE from a discovery procedure.

Moreover, it may apply the abovementioned two methods together. In particular, if the initiating UE receives a reject message, the initiating UE adds a target UE to a forbidden UE list and starts a timer. A state that the target UE is added to the forbidden UE list is maintained until the timer expires. The target UE can be deleted from the forbidden UE list when the timer expires.

In the following, a method of preventing a target UE from being reselected using two or more reject causes is explained. In case of using a single reject cause only, since an operation of a target UE is restricted, an intention may become unclear. In particular, it may be able to utilize two or more reject causes to determine whether the reselection of the target UE is restricted permanently or temporarily. Or, it may be able to utilize two or more reject causes to explicitly inform the initiating UE of whether or not the reselection is allowed.

According to one embodiment, a single reject cause (e.g., cause #1) is used for permanently preventing a target UE from being reselected. If a UE receives a reject message including the reject cause, the UE may not perform a link setup procedure or a discovery procedure on the target UE. In this case, the aforementioned method of adding the target UE to the forbidden UE list can be utilized. Meanwhile, in order to distinguish the present reject cause from a reject cause described in the following, the present reject cause for permanently preventing the target UE from being reselected can be represented as "#1: direct communication to target UE not allowed and retransmission not allowed". If the reselection of the target UE is not allowed, transmission of all messages including a PC5 signaling message transmitted to the target UE is not allowed as well.

Subsequently, "cause #4: direct communication to target UE not allowed but retransmission allowed" or "cause #4: direct communication to target UE temporarily not allowed" can be newly defined as a different reject cause. This reject cause is distinguished from the reject cause for the permanent restriction. Having received the reject cause, the initiating UE can retransmit a direct communication request message to the target UE. In particular, 'retransmission' written on the reject cause indicates that the direct communication request message is retransmitted to the same target UE, which has transmitted a direct communication reject message.

Meanwhile, if a UE does not want to immediately retransmit a direct communication request message to a target UE while retransmission is allowed, similar to the aforementioned description, the UE may utilize a timer. In particular, if a reject message including a timer is received or a timer is configured to an initiating UE in advance, a value of the timer can be temporarily utilized for preventing the target UE from being reselected. If the timer is applied, the initiating UE waits for the expiry of the timer and can perform retransmission on the target UE. In this case, a link setup procedure and a discovery procedure can be performed after the timer expires. On the contrary, if the timer is not applied, the initiating UE receives a reject message according to a necessity and may be then able to immediately perform retransmission.

A case of not using a timer is explained. If an initiating UE receives a reject message including the aforementioned cause #1, since the initiating UE is unable to permanently reselect a target UE, the initiating UE performs a reselection procedure to discover a new target UE. On the contrary, when the initiating UE receives a reject message including the aforementioned cause #4, if it is necessary for the initiating UE to have a link setup, the initiating UE can immediately retransmit a direct communication request message. In particular, although a timer is not applied, it may be able to permanently/temporarily prevent a target UE from being reselected by utilizing two or more reject causes.

The proposed embodiments are summarized in the following with reference to FIG. 17. An initiating UE (i.e., a remote UE) transmits a direct communication request message to a target UE (i.e., a relay UE) [S1710]. Subsequently, the initiating UE receives a direct communication reject message from the target UE. In this case, if a reject cause included in the reject message corresponds to a permanent reject cause [S1720], the initiating UE performs a reselection procedure on UEs except the target UE, which has transmitted the reject message [S1730]. On the contrary, if the reject cause included in the reject message corresponds to a temporary reject cause [S1740], the initiating UE performs a reselection procedure on UEs except the target UE while a timer is operating [S1750]. If a timer is not used, although the temporary reject cause is received, the initiating UE may immediately retransmit the direct communication request message or perform the reselection procedure on the target UE.

As mentioned in the foregoing description, information on whether or not a target UE is reselected and a timer value can be transmitted to the initiating UE in a manner of being included in a direct communication reject message. Table 2 in the following shows an example that the information on whether or not a target UE is reselected is displayed in the direct communication reject message. Tables 3 and 4 show an example that 'extended PC5 signaling cause' IE (information element) indicating a cause is implemented by bits.

TABLE 2

| IEI | Information Element | Type/Reference | Presence | Format | Length |
|-----|---------------------|----------------|----------|--------|--------|
|     | DIRECT_COMMUNICATION_REJECT message identity | PC5-SP Message Type 12.x.1.1. | M | V | 1 |
|     | Sequence Number | Sequence Number 12.x.1.2 | M | V | 2 |
|     | PC5 Signalling Cause Value | PC5 Signalling Cause Value 12.x.1.7 | M | V | 1 |
|     | Extended PC5 Signalling cause | Extended PC5 Signalling cause 11.a.b.c | O | TLV | 1 |

TABLE 3

| 8 | 7 | 6 | 5 | 4 | 3 | 2 | 1 | |
|---|---|---|---|---|---|---|---|---|
| Extended PC5 Signalling Cause IEI | | | 0 | 0 | 0 | Spare | Reselection allowed | octet1 |

TABLE 4

E-UTRAN allowed value (octet 1, bit 1)
Bit 1
0    reselection allowed (or, retransmission allowed)
1    reselection not allowed (or, retransmission not allowed)
Bit 2 to 4 of octet 1 are spare and shall be coded as zero Table 5 in the following shows an example that a timer value for temporarily preventing a target UE from being reselected is included in a direct communication reject message. Tables 6 and 7 show an actual implementation example of the timer value.

TABLE 5

| IEI | Information Element | Type/Reference | Presence | Format | Length |
|-----|---------------------|----------------|----------|--------|--------|
|     | DIRECT_COMMUNICATION_REJECT message identity | PC5-SP Message Type 12.x.1.1. | M | V | 1 |
|     | Sequence Number | Sequence Number 12.x.1.2 | M | V | 2 |
|     | PC5 Signalling Cause Value | PC5 Signalling Cause Value 12.x.1.7 | M | V | 1 |
|     | T4xxxx | T4xxxx | O | TLV | 3 |

TABLE 6

| 8 | 7 | 6 | 5 | 4 | 3 | 2 | 1 | |
|---|---|---|---|---|---|---|---|---|
| | | | T4xxxx IEI | | | | | octet1 |
| | Unit | | | Timer value | | | | octet2 |

TABLE 7

Timer value (octet 2)
Bit 5 to 1 represent the binary coded timer value.
Bit 6 to 8 defines the timer value unit for T4xxx as follows:

| Bit 8 | Bit 7 | Bit 6 | |
|---|---|---|---|
| 0 | 0 | 0 | value is incremented in multiples of 2 seconds |
| 0 | 0 | 1 | value is incremented in multiples of 1 minute |
| 0 | 1 | 0 | value is incremented in multiples of decihours |
| 1 | 1 | 1 | value indicates that the timer is deactivated |

Other values shall be interpreted as multiples of 1 minute in this version of the protocol.

3.2 Embodiment 2

In the following, an embodiment for the second problem is explained. When an initiating UE transmits a direct communication request message, if a new relay UE is discovered before an accept response or a reject response is received from a target UE, a problem occurs.

The initiating UE starts a timer T4100 while transmitting a direct communication request message according to a direct link setup procedure and waits for a response from the target UE. In this case, the initiating UE can perform a discovery procedure irrespective of the direct link setup procedure which is in progress. The discovery procedure and the direct link setup procedure can be performed at the same time. The discovery procedure may correspond to a UE-to-network relay discovery operation. Or, the discovery procedure may correspond to a relay discovery additional information transmission operation that announces TMGI (temporary mobile group identity)-related information capable of being received and forwarded by the UE-to-network relay operation. The latter one may apply detail contents described in TS 23.303 5.3.7 paragraph.

In the following, an operation of an initiating UE is described when the initiating UE discovers/selects a target UE of better radio link quality via the aforementioned discovery procedure before a response is received from a target UE. Meanwhile, according to a related art, a UE was unable to transmit a new direct communication request message to the same target UE while a timer T4100 is operating. In particular, it means that it is able to transmit the direct communication request message to the new target UE.

It may be able to mainly consider two methods. First of all, the initiating UE may start a new link setup procedure while terminating the timer T4100. In particular, the initiating UE ends the direct link setup procedure by terminating the timer in use and may be able to start a link setup procedure with a new target UE. In this case, although a direct communication accept message is received from the old target UE, the initiating UE does not use the direct link and performs a direct link release procedure on the old target UE.

As a second method, the initiating UE may start a new direct link setup procedure while not terminating the timer in use. In this case, although a direct communication accept message is received from the old target UE, the initiating UE does not use the direct link and performs a direct link release procedure on the old target UE.

In order to prevent a target UE from being frequently changed, additional contents applicable to both of the methods are explained. It may be able to configure a minimum link quality gap between a new target UE and an old target UE. If radio link quality of the new target UE is not significantly better than that of the old target UE, the initiating UE may set a limit on selecting a new target UE. Or, if communication time maintained with the old target UE is too short, the initiating UE may set a limit on selecting a new target UE to prevent a target UE from being frequently changed.

3.3. Embodiment 3

Figure 18:
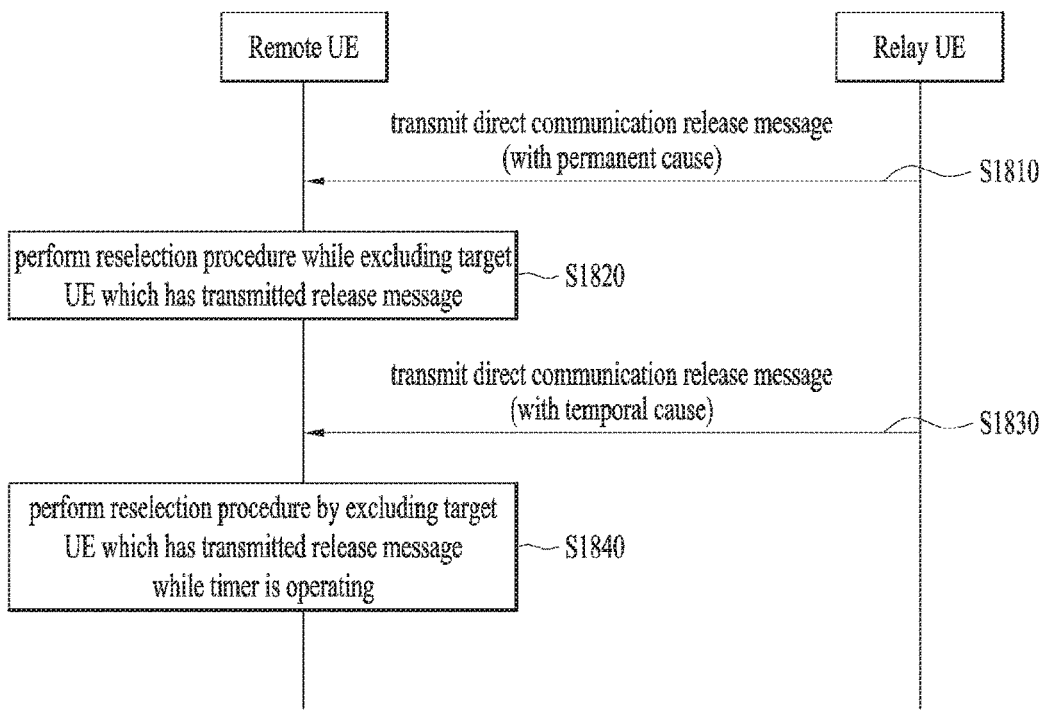

In the following, third embodiment is explained with reference to FIG. 18. The third embodiment proposes an operation of a remote UE for a direct communication release message.

A releasing UE (or, a relay UE) can transmit a direct link release message to a peer UE (or, a remote UE) while the relay UE and the remote communicate with each other through a direct link. The direct link release message can include information indicating "cause #1: communication to peer UE no longer needed" as a cause of releasing. Meanwhile, the releasing cause may fail to clearly represent the intention of the releasing UE. In particular, when the communication performed between the relay UE and the remote UE is normally terminated, the releasing cause has no problem, However, if the link is released due to an abnormal cause (e.g., when radio link quality is unexpectedly deteriorated, etc.), it is necessary to define a new release cause to prevent a relay UE from being reselected.

In the aspect of preventing reselection of the releasing UE, the cause mentioned earlier in the embodiment 1 can be similarly utilized. In particular, the "cause #1: direct communication to target UE not allowed" or a newly defined release cause can be used as a release cause.

First of all, a method of preventing a reselection of a releasing UE using a single release cause only is explained. If a direct link release message including the aforementioned release cause #1 or a newly defined release cause is received, a peer UE may operate using two methods described in the following. As a first method, the peer UE includes a releasing UE, which has transmitted a direct link release message, in a forbidden UE list for link setup. The releasing UE included in the list can be excluded not only from a link setup procedure but also from a discovery procedure.

As a second method, it may consider operating a back-off timer. In particular, if peer UE receives a release message, the peer UE starts a prescribed back-off timer. A value of the back-off timer can be transmitted to the peer UE in a manner of being included in the direct communication release message or can be configured in the peer UE in advance. If the value of the back-off timer is transmitted to the peer UE in a manner of being included in the direct communication release message, the received value is used instead of the value configured to the peer UE in advance. The peer UE does not perform a link setup procedure on the releasing UE, which has transmitted the release message, while the back-off timer is operating and excludes the releasing UE from a discovery procedure.

Moreover, it may apply the abovementioned two methods together. In particular, if the peer UE receives a release message, the peer UE adds a target releasing UE to a forbidden UE list and starts a timer. A state that the target releasing UE is added to the forbidden UE list is maintained until the timer expires. The target releasing UE can be deleted from the forbidden UE list when the timer expires.

In the following, a method of preventing a releasing UE from being reselected using two or more release causes is explained. In case of using a single release cause only, since an operation of a peer UE is restricted, an intention may become unclear. In particular, it may be able to utilize two or more release causes to determine whether the reselection of the releasing UE is restricted permanently or temporarily. Or, it may be able to utilize two or more release causes to explicitly inform the peer UE of whether or not the reselection is allowed.

According to one embodiment, a single release cause (e.g., cause #1) is used for permanently preventing a releasing UE from being reselected. If a peer UE receives a release message including the release cause, the peer UE may not perform a link setup procedure or a discovery procedure on the releasing UE. In this case, the aforementioned method of adding the releasing UE to the forbidden UE list can be utilized. Meanwhile, in order to distinguish the present release cause from a release cause described in the following, the present release cause for permanently preventing the releasing UE from being reselected can be represented as "#1: direct communication to target UE not allowed and retransmission not allowed". If the reselection of the releasing UE is not allowed, transmission of all messages including a PC5 signaling message transmitted to the releasing UE is not allowed as well.

Subsequently, "cause #4: direct communication to target UE not allowed but retransmission allowed" or "cause #4: direct communication to target UE temporarily not allowed" can be newly defined as a different release cause. This release cause is distinguished from the release cause for the permanent restriction. Having received the release cause, the peer UE can retransmit a direct communication request message to the releasing UE. In particular, 'retransmission' written on the release cause indicates that the direct communication request message is retransmitted to the same releasing UE, which has transmitted a direct communication release message.

Meanwhile, if a UE does not want to immediately retransmit a direct communication request message while retransmission is allowed, similar to the aforementioned description, the UE may utilize a timer. In particular, if a release message including a timer is received or a timer is configured to a peer UE in advance, a value of the timer can be temporarily utilized for preventing the releasing UE from being reselected. If the timer is applied, the peer UE waits for the expiry of the timer and can perform retransmission on the releasing UE. In this case, a link setup procedure and a discovery procedure can be performed after the timer expires. On the contrary, if the timer is not applied, the peer UE receives a release message according to a necessity and may be then able to immediately perform retransmission.

A case of not using a timer is explained. If a peer UE receives a release message including the aforementioned cause #1, since the peer UE is unable to permanently reselect a releasing UE, the peer UE performs a reselection procedure to discover a new relay UE. On the contrary, when the peer UE receives a release message including the aforementioned cause #4, if it is necessary for the peer UE to have a link setup, the peer UE can immediately retransmit a direct communication request message. In particular, although a timer is not applied, it may be able to permanently/temporarily prevent a releasing UE from being reselected by utilizing two or more reject causes.

The proposed embodiments are summarized in the following with reference to FIG. 18. A releasing UE (i.e., a relay UE) transmits a direct communication release message to a peer UE (i.e., a remote UE) [S1810, S1830]. In this case, if a release cause included in the release message corresponds to a permanent reject cause [S1810], the peer UE performs a reselection procedure on UEs except the releasing UE, which has transmitted the release message [S1820]. On the contrary, if the release cause included in the release message corresponds to a temporary release cause [S1830], the peer UE performs a reselection procedure on UEs except the releasing UE while a timer is operating [S1840]. If a timer is not used, although the temporary reject cause is received, the peer UE may immediately retransmit the direct communication request message or perform the reselection procedure on the releasing UE.

As mentioned in the foregoing description, information on whether or not a releasing UE is reselected and a timer value can be transmitted to the peer UE in a manner of being included in a direct communication release message. Table 8 in the following shows an example that the information on whether or not a releasing UE is reselected is displayed in the direct communication release message. Tables 9 and 10 show an example that 'extended PC5 signaling cause' IE (information element) indicating a cause is implemented by bits.

TABLE 8

| IEI | Information Element | Type/Reference | Presence | Format | Length |
|-----|---------------------|----------------|----------|--------|--------|
|  | DIRECT_COMMU-NICATION_REJECT message identity | PC5-SP Message Type 12.x.1.1. | M | V | 1 |
|  | Sequence Number | Sequence Number 12.x. 1.2 | M | V | 2 |
|  | PC5 Signalling Cause Value | PC5 Signalling Cause Value 12.x.1.7 | M | V | 1 |
|  | Extended PC5 Signalling cause | Extended PC5 Signalling cause 11.a.b.c | O | TLV | 1 |

TABLE 9

| 8 | 7 | 6 | 5 | 4 | 3 | 2 | 1 | |
|---|---|---|---|---|---|---|---|---|
| Extended PC5 Signalling Cause IEI | | | 0 | 0 | 0 | Spare | Reselection allowed | octet1 |

TABLE 10

E-UTRAN allowed value (octet 1, bit 1)
Bit 1
0    reselection allowed (or, retransmission allowed)
1    reselection not allowed (or, retransmission not allowed)
Bit 2 to 4 of octet 1 are spare and shall be coded as zero Table 11 in the following shows an example that a timer value for temporarily preventing a releasing UE from being reselected is included in a direct communication release message. Tables 12 and 13 show an actual implementation example of the timer value.

TABLE 11

| IEI | Information Element | Type/Reference | Presence | Format | Length |
|---|---|---|---|---|---|
| | DIRECT_COMMU-NICATION_REJECT message identity | PC5-SP Message Type 12.x.1.1. | M | V | 1 |
| | Sequence Number | Sequence Number 12.x.1.2 | M | V | 2 |
| | PC5 Signalling Cause Value | PC5 Signalling Cause Value 12.x.1.7 | M | V | 1 |
| | T4xxxx | T4xxxx | O | TLV | 3 |

TABLE 12

| 8 | 7 | 6 | 5 | 4 | 3 | 2 | 1 | |
|---|---|---|---|---|---|---|---|---|
| | | | T4xxxx IEI | | | | | octet1 |
| Unit | | | Timer value | | | | | octet2 |

TABLE 13

Timer value (octet 2)
Bit 5 to 1 represent the binary coded timer value.
Bit 6 to 8 defines the timer value unit for T4xxx as follows:

| Bit 8 | Bit 7 | Bit 6 | |
|---|---|---|---|
| 0 | 0 | 0 | value is incremented in multiples of 2 seconds |
| 0 | 0 | 1 | value is incremented in multiples of 1 minute |
| 0 | 1 | 0 | value is incremented in multiples of decihours |
| 1 | 1 | 1 | value indicates that the timer is deactivated |

Other values shall be interpreted as multiples of 1 minute in this version of the porotocol.

The third embodiment can be applied to a case of checking a radio link quality via a discovery message and a case of transmitting a direct communication release message when the radio link quality is degraded to a prescribed level or more.

3.4 Embodiment 4

Figure 19:
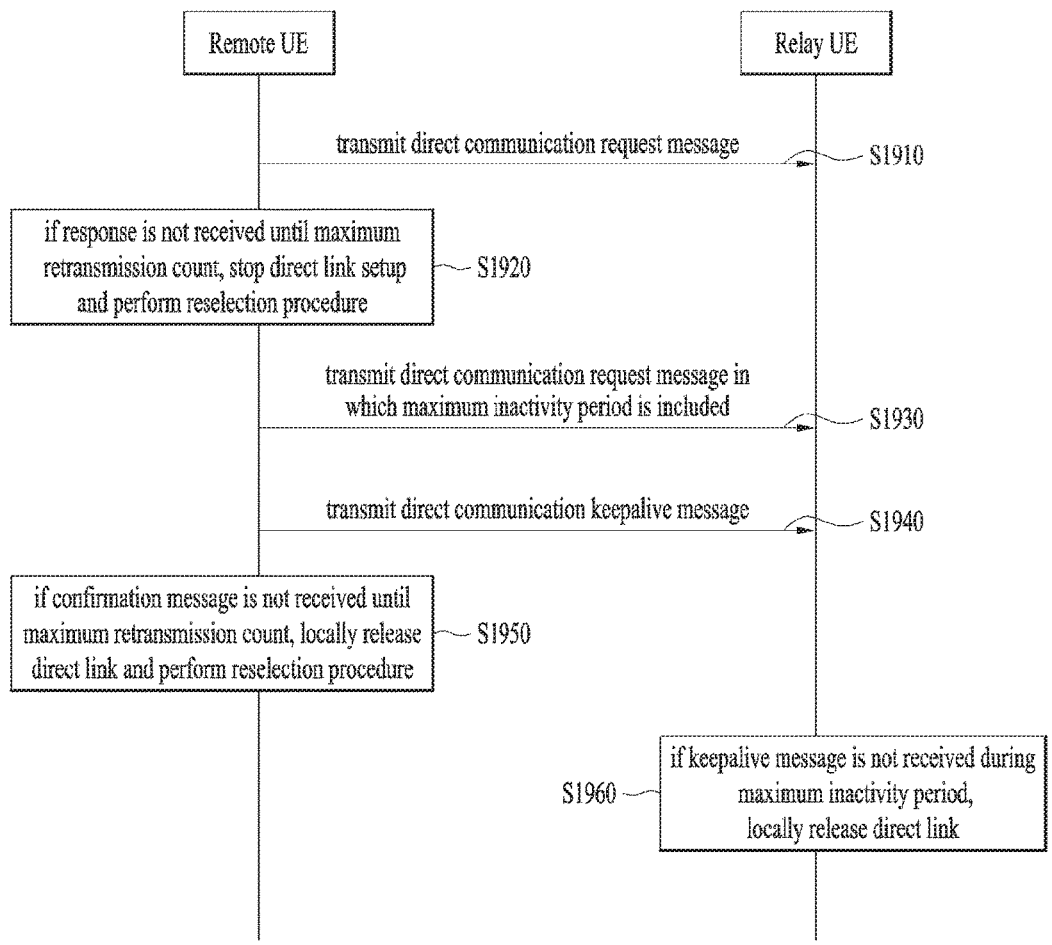
Figure 20:
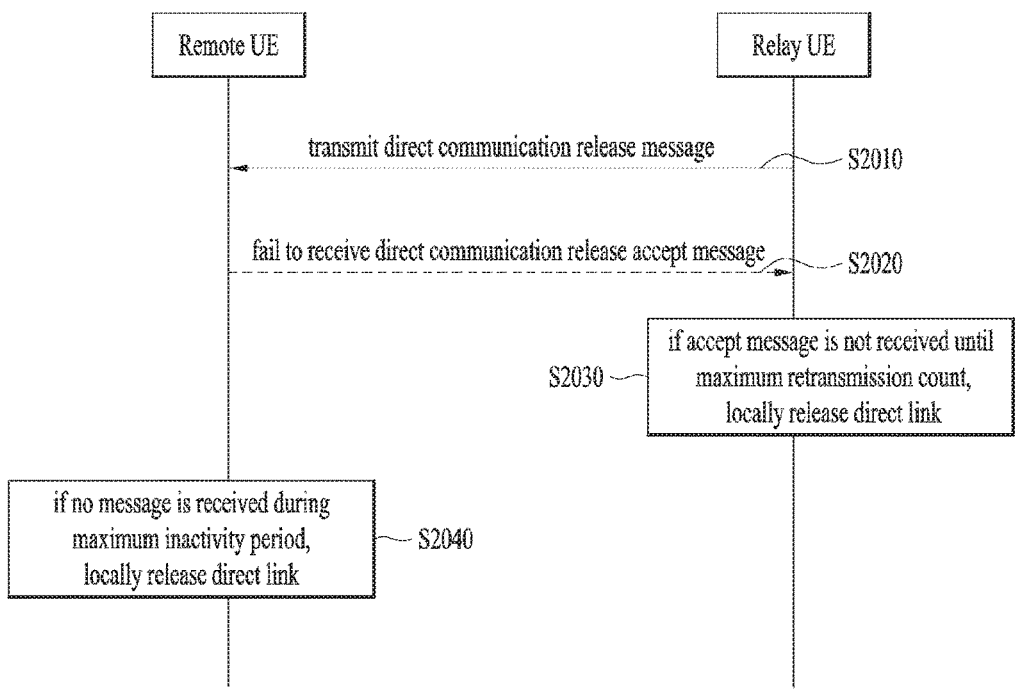

In the following, fourth embodiment and fifth embodiment are explained with reference to FIG. 19. First of all, in order to prevent both a remote UE and a relay UE from transmitting a keepalive message, a method of determining an entity of transmitting a direct communication keepalive message among the remote UE and the relay UE is proposed as the fourth embodiment.

According to current TS 24.334, a UE transmitting a direct communication keepalive message is defined as a 'requesting UE'. The requesting UE can be selected using three schemes. As a first scheme, a UE becoming an entity of transmitting a specific message can be determined as the requesting UE. For example, a UE transmitting a direct communication request message or a UE transmitting a direct communication accept message can be determined as the requesting UE that transmits a keepalive message. On the contrary, a UE receiving the direct communication request message or a UE receiving the direct communication accept message may become the requesting UE. The UE is able to recognize that the UE corresponds to a peer UE.

As a second scheme, a specific UE can be selected as a requesting UE. In particular, TS 23.303 defines a remote UE and a relay UE establishing one-to-one communication. In a relay scenario, the remote UE or the relay UE may become a requesting UE. If one of the remote UE and the relay UE becomes a requesting UE and the requesting UE transmits a keepalive message to another UE, the UE, which has received the keepalive message, is able to recognize that the UE corresponds to a peer UE.

As a third scheme, it may consider a scheme that a specific UE has a decision of selecting a requesting UE. For example, a UE-to-network relay UE can determine a requesting UE from among the UE-to-network relay UE and a remote UE. Of course, the remote UE can select a requesting UE. A UE having a decision determines a requesting UE and forwards the determined requesting UE to a counterpart UE.

In this case, an indicator indicating a UE, which is determined as a requesting UE, can be forwarded to the counterpart UE. The indicator can be forwarded to the counterpart UE in a manner of being included in a PC5 signaling message (e.g., a direct communication request message or a direct communication accept message). And, the indicator may be able to explicitly indicate the requesting UE as a UE A or a UE B. For example, a bit '0' can indicate that the UE A is selected as the requesting UE and a bit '1' can indicate that the UE B is selected as the requesting UE. The UE A or the UE B may become a relay UE or a remote UE.

When a requesting UE is selected using the third scheme, a UE may select the requesting UE in consideration of situations of two UEs. In particular, the requesting UE can be selected in consideration of information on a status (e.g., load status, battery status, class of a UE, etc.) of each UE. And, a UE having information of two UEs can determine a UE appropriate for a requesting UE.

3.5 Embodiment 5

In the following, when a response is not received in response to a direct communication request message or a direct communication keepalive message, a necessary operation is explained as a fifth embodiment of the present invention. A case of the direct communication request message is explained first. An initiating UE starts a T4100 timer at the time of transmitting the direct communication request message. If the timer expires, the initiating UE retransmits the direct communication request message. In this case, the retransmission can be performed up to the maximally allowed retransmission count.

When the direct communication request message is transmitted, if the initiating UE fails to receive a response from a target UE until the maximally allowed retransmission count, the initiating UE aborts a link setup procedure for a direct link and may be able to perform a discovery procedure for finding out a different target UE [S1910, S1920]. Or, if a different target UE is discovered, the initiating UE may perform a link setup procedure with the discovered UE. If an accept message or a reject message is not received until the maximum retransmission count in response to the direct communication request message, it may indicate that the initiating UE is unable to establish a direct link with a target UE. Hence, it is not necessary for the initiating UE to maintain or perform a link setup procedure with the target UE. In particular, the initiating UE performs a relay reselection procedure for a new link setup procedure.

Meanwhile, in the reselection procedure, the direct communication request message can be retransmitted to the target UE, which has transmitted the direct communication request message. Yet, if the initiating UE immediately transmits the direct communication request message to the same target UE to perform the link setup procedure, it may be inefficient. Hence, it may be able to configure the retransmission to be performed after prescribed time elapses.

For example, the initiating UE starts a back-off timer after the link setup procedure is aborted and does not transmit the direct communication request message to the same target UE or does not perform the discovery procedure until the timer expires. If the timer expires, the initiating UE retransmits the direct communication request message to the same target UE to perform a link setup procedure, a reselection procedure on the target UE, or a discovery procedure.

In the following, a case of the direct communication keepalive message is explained. In the following, assume that a remote UE is selected as an entity of transmitting the direct communication keepalive message according to the aforementioned fourth embodiment.

If a keepalive ACK message is not received after a keepalive message is transmitted, it is mainly resulted from two cases. As a first case, although a requesting UE transmits a keepalive message, a peer UE may fail to receive the keepalive message. As a second case, although a peer UE receives a keepalive message and transmits a keepalive ACK message, a requesting UE may fail to receive the keepalive ACK message. The requesting UE and the peer UE can determine that a current direct link is not valid anymore for the both cases. Hence, the two UEs may locally release the direct link.

A specific procedure is explained in the aspect of the requesting UE and the peer UE, respectively.

The requesting UE (i.e., a remote UE) retransmits the keepalive message after a timer T4101, which has started at the time of transmitting the direct communication keepalive message, expires and repeats the retransmission until the maximally allowed retransmission count [S1940]. If the requesting UE fails to receive a response (e.g., a reject response or an accept response) from the peer UE while attempting to perform retransmission until the maximum retransmission count, the requesting UE determines that current radio link quality is not valid anymore. Subsequently, the requesting UE aborts the keepalive procedure and locally release the radio link [S1950].

In case of Model 1 in-coverage E-UTRAN, a method of locally releasing a radio link can be performed by notifying an eNB that communication with the peer UE is terminated through sidelink UE information. Having received the sidelink UE information, the eNB stops allocating a radio resource used for performing transmission to the peer UE. In case of Model 2 in-coverage E-UTRAN or out-coverage E-UTRAN, a requesting UE stops a transmission operation for a peer UE and stops using a radio resource for performing transmission.

When a radio link is locally released by a UE, the UE performs a discovery procedure to discover a different target UE. If the different target UE is discovered, the UE performs a direct link setup procedure with the target UE and performs a reselection procedure to select the new target UE. In this case, it is unable to immediately perform the discovery procedure or the direct link setup procedure on the same target UE. The discovery procedure or the direct link setup procedure can be performed after prescribed time elapses. Similar to the contents on the direct communication request message, it may consider a scheme of using a back-off timer. In particular, a requesting UE starts the timer after a keepalive procedure is aborted. The requesting UE does not perform a discovery procedure or a link setup procedure on the same peer UE until the timer expires. After the timer expires, the requesting UE retransmits the direct communication request message to the same peer UE to perform a link setup procedure. Or, the requesting UE can perform a reselect procedure or a discovery procedure on the same peer UE.

Meanwhile, the peer UE (i.e., a relay UE) receives a direct communication keepalive message from the requesting UE and transmits a confirmation message to the requesting UE. In this case, unlike the requesting UE, since a message retransmission operation capable of determining a current radio link is not defined in the peer UE, a problem may occur.

One embodiment of the present invention proposes that the requesting UE defines a maximum inactivity period and transmits the maximum inactivity period to the peer UE by including the maximum inactivity period in the direct communication request message [S1930]. If no communication is performed or PC5 signaling does not occur (i.e., timing at which transmission of a data packet is completed or timing right after signaling transmission is completed) after a wireless connection is established, the peer UE starts an inactivity timer T4abcd. The timer T4abcd corresponds to a timer that operates during a period as much as the aforementioned maximum inactivity period. If certain communication or PC5 signaling starts again (i.e., if transmission of a data packet starts), the timer is terminated and is configured by an initial value.

If the timer T4abcd expires, the peer UE determines that a wireless connection established with the requesting UE is not valid anymore and locally releases the wireless connection [S1960]. It is necessary to configure a value of the timer T4abcd corresponding to the maximum inactivity period in consideration of the keepalive maximum retransmission count of the requesting UE. The maximum inactivity period can be calculated in consideration of a transmission period of a keepalive message transmitted by the requesting UE, a retransmission time interval of the keepalive message, and the maximum retransmission count. For example, the maximum inactivity period can be calculated according to Equation 1 described in the following.

(Inactivity timerkeep)≥(transmission period of keepalive message)+(retransmission time interval)*(maximum number of allowed retransmissions)  [Equation 1]

In Equation 1, 'inactivity timerkeep' corresponds to a parameter indicating the maximum inactivity period, 'transmission period of keepalive message' corresponds to a parameter indicating a period of transmitting a keepalive message transmitted by the requesting UE, 'retransmission time interval' corresponds to a parameter indicating an interval of retransmitting a keepalive message transmitted by the requesting UE, and 'maximum number of allowed retransmissions' corresponds to a parameter indicating a maximum allowable retransmission count of a keepalive message retransmitted by the requesting UE.

As mentioned in the foregoing description, the maximum inactivity period can be received from the requesting UE through the direct communication request message in the link setup procedure. The maximum inactivity period may correspond to a value set to the peer UE in advance. If the value of the maximum inactivity period is included in the direct communication request message, the peer UE follows the received value. And, the maximum inactivity period can also be transmitted to the peer UE in a manner of being included in the direct communication keepalive message transmitted by the requesting UE. If a new maximum inactivity period value is received, the peer UE uses the new maximum inactivity period value instead of a previously stored value.

Meanwhile, the maximum inactivity period can be differently configured according to each of requesting UEs. In particular, a local configuration value may vary according to a UE. This is because it is able to differently implement a retransmission interval or a maximally allowed retransmission count of a keepalive message according to a UE. In particular, since mobility, a reporting type, a message transmission pattern, and the like are different according to a UE, a value corresponding to the maximum inactivity period can be differently configured according to a UE.

According to the foregoing description, if the timer T4*abcd* corresponding to the maximum inactivity period expires, the peer UE locally releases a wireless connection. In this case, the peer UE may transmit a release message to the requesting UE before the wireless connection is locally released. In particular, if the timer T4*abcd* corresponding to the maximum inactivity period expires, the peer UE transmits a direct communication release message to the requesting UE and then locally releases the wireless connection.

3.6 Embodiment 6

When a releasing UE transmits a direct communication release message to a peer UE, if the releasing UE fails to receive a response from the peer UE, a problem may occur. An embodiment for the problem is described in the embodiment 6. Similar to the embodiment 5, the embodiment 6 is explained in the aspect of the releasing UE (i.e., a relay UE) and the peer UE (i.e., a remote UE), respectively.

First of all, the releasing UE transmits a direct communication release message to the peer UE [S2010] and starts a timer T4103. If a direct communication release accept message is not received from the peer UE in response to the release message until the timer T4103 expires [S2020], the releasing UE can locally release a direct link without retransmitting the release message to the peer UE. Or, the releasing UE is able to retransmit the direct communication release message to the peer UE up to the maximally allowed retransmission count after the timer T4103 expired. If the releasing UE fails to receive a response from the peer UE until the maximally allowed retransmission count, the releasing UE can locally release a direct link [S2030]. As mentioned in the foregoing description, whether or not a retransmission is performed may vary according to a status of the releasing UE. For example, whether or not a retransmission is performed may vary according to a release cause included in the direct communication release message.

In the following, an operation of a peer UE receiving a direct communication release message is explained. If the direct communication release message is received from a releasing UE, the peer UE transmits a direct communication release accept message to the releasing UE. In this case, since a message retransmission operation capable of determining a current wireless connection established with the releasing UE is not defined, the peer UE may have a problem.

One embodiment of the present invention proposes that the peer UE defines a maximum inactivity period. If no message is received during the period, the peer UE locally releases a direct link. Specifically, if no communication is performed or PC5 signaling does not occur (i.e., timing at which transmission of a data packet is completed or timing right after signaling transmission is completed) after the direct communication release accept message is transmitted, the peer UE starts an inactivity timer T4*abcd*. The timer T4*abcd* corresponds to a timer that operates during a period as much as the aforementioned maximum inactivity period. If certain communication or PC5 signaling starts again (i.e., if transmission of a data packet starts), the timer is terminated and is configured by an initial value.

If the timer T4*abcd* expires, the peer UE determines that a wireless connection established with the releasing UE is not valid anymore and locally releases the wireless connection [S2040]. It is necessary to configure a value of the timer T4*abcd* corresponding to the maximum inactivity period in consideration of the keepalive maximum retransmission count of the releasing UE. The maximum inactivity period can be calculated in consideration of a transmission period of a keepalive message transmitted by the releasing UE, a retransmission time interval of the keepalive message, and the maximum retransmission count. For example, the maximum inactivity period can be calculated according to the aforementioned Equation 1.

The maximum inactivity period can be calculated and stored by the peer UE and may correspond to a random configured value. And, the maximum inactivity period calculated by the peer UE can be forwarded to the releasing UE in advance through the direct communication request message in the direct link setup procedure with the releasing UE [e.g., S1930 in FIG. 19].

Meanwhile, the maximum inactivity period can be differently configured according to each of peer UEs. In particular, a local configuration value may vary according to a UE. This is because it is able to differently implement a retransmission interval or a maximally allowed retransmission count of a keepalive message according to a UE. In particular, since mobility, a reporting type, a message transmission pattern, and the like are different according to a UE, a value corresponding to the maximum inactivity period can be differently configured according to a UE.

3.7 Embodiment 7

Lastly, a triggering condition for a relay selection/reselection procedure and a condition for selecting a candidate target UE are explained as an embodiment for the seventh problem.

First of all, a triggering condition for a relay selection/reselection procedure is explained. Referring to the embodiments 1 and 3, if a remote UE receives a direct communication reject message or a direct communication release message, the remote UE is configured not to reselect a relay UE. If a permanent reject cause/release cause is received, the remote UE remembers a corresponding relay UE and excludes the relay UE from a relay UE selection/reselection procedure (or, a target UE selection/reselection procedure). Subsequently, a selection/reselection procedure for selecting a new relay UE is performed.

Meanwhile, when a temporary reject cause/release cause is received and retransmission is immediately allowed, if a link setup is required, a remote UE can immediately transmit a direct communication request message to the same UE. On the contrary, when a temporary reject cause/release cause is received but retransmission is not immediately performed (e.g., a timer value is not 0, deactivated, nor null), if a link setup is required, the remote UE may perform the relay UE selection/reselection procedure on the same UE or immediately transmit a direct communication request message to the same UE after a prescribed time period (e.g., expiry time of a timer).

Referring to the aforementioned embodiments 5 and 6, when a remote UE attempts to retransmit a specific message to a counterpart node up to the maximally allowed retransmission count, if the remote UE fails to receive a response from the counterpart node, the relay UE selection/reselection procedure can be triggered. In particular, although a response is not received in response to a direct communication reject message, if a direct link setup is required, the remote UE performs the relay UE selection/reselection procedure. Similarly, if a confirmation response is not received in response to a direct communication keepalive message, the remote UE locally releases a direct link and performs the relay UE selection/reselection procedure.

In the following, a condition for selecting a candidate target UE is explained. When a direct communication reject message or a direct communication release message is received from a target UE, a reject cause/release cause or an indicator indicating that reselection is not allowed to a corresponding UE can be received together with the direct communication reject message or the direct communication release message. In this case, it is necessary for an initiating UE or a peer UE to exclude the UE when selecting or reselecting a target UE. In other word, when a candidate target UE is selected to establish a new direct link, UEs, which have transmitted a reject/release message, are excluded. This procedure can be performed in a manner of adding the UEs to a forbidden UE list. The UEs added to the forbidden UE list are excluded from the procedure of selecting/reselecting a new target UE.

In the foregoing description, various embodiments for performing a direct communication method between UEs have been explained. Since it is able to efficiently utilize radio resources and reduce signaling overhead through the embodiments, it is able to solve the problem of the related art.

4. Device Configurations

Figure 21:
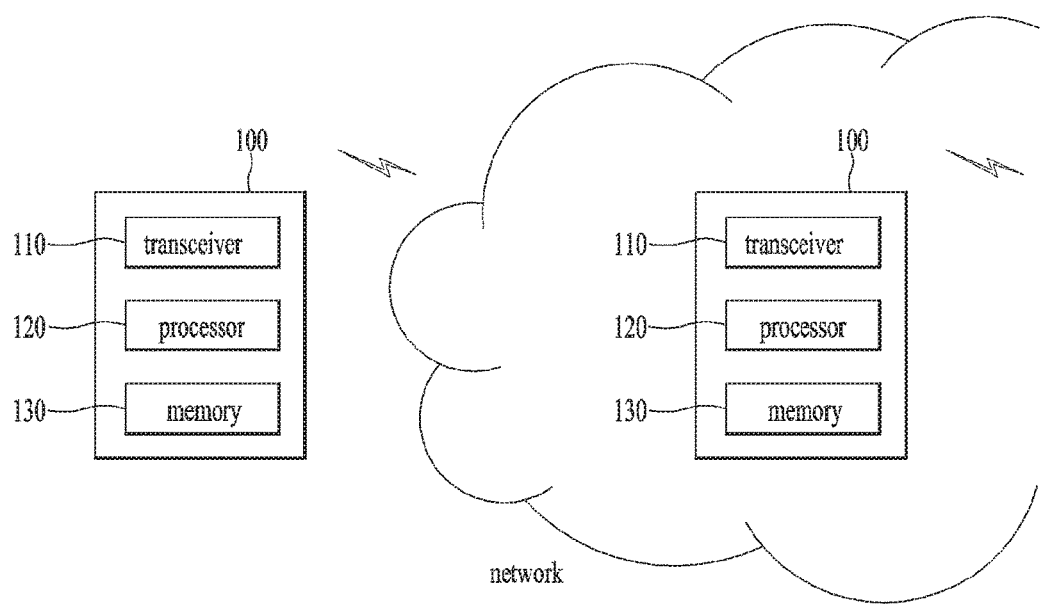
FIG. 21 is a diagram illustrating a configuration of a node device according to a proposed embodiment.

FIG. 21 is a diagram illustrating configurations of node devices according to a proposed embodiment.

A user equipment (UE) 100 may include a transceiver 110, a processor 120, and a memory 130. The transceiver 110 may be configured to transmit and receive various signals, data, and information to/from an external device. Alternatively, the transceiver 110 may be implemented with a combination of a transmitter and a receiver. The UE 100 may be connected to the external device by wire and/or wirelessly. The processor 120 may be configured to control overall operations of the UE 100 and process information to be transmitted and received between the UE 100 and the external device. Moreover, the processor 120 may be configured to perform the UE operation proposed in the present invention. The memory 130, which may be replaced with an element such as a buffer (not shown in the drawing), may store the processed information for a predetermined time.

Referring to FIG. 21, a network node 200 according to the present invention may include a transceiver 210, a processor 220, and a memory 230. The transceiver 210 may be configured to transmit and receive various signals, data, and information to/from an external device. The network node 200 may be connected to the external device by wire and/or wirelessly. The processor 220 may be configured to control overall operations of the network node 200 and process information to be transmitted and received between the network node device 200 and the external device. Moreover, the processor 220 may be configured to perform the network node operation proposed in the present invention. The memory 230, which may be replaced with an element such as a buffer (not shown in the drawing), may store the processed information for a predetermined time.

The specific configurations of the UE 100 and the network node 200 may be implemented such that the aforementioned various embodiments of the present invention can be independently applied or two or more embodiments can be simultaneously applied. For clarity, redundant description will be omitted.

The embodiments of the present invention may be implemented using various means. For instance, the embodiments of the present invention may be implemented using hardware, firmware, software and/or any combinations thereof.

In case of the implementation by hardware, a method according to each embodiment of the present invention may be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code may be stored in a memory unit and be then executed by a processor. The memory unit may be provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Therefore, the present invention is non-limited by the embodiments disclosed herein but intends to give a broadest scope matching the principles and new features disclosed herein.

INDUSTRIAL APPLICABILITY

The aforementioned direct communication method between UEs can be applied to not only the 3GPP system but also various wireless communication systems including an IEEE 802.16x system and IEEE 802.11x system. Further, the proposed method can also be applied to an mmWave communication system using super-high frequency band.

What is claimed is:

1. A method of performing a direct communication, which is performed by a relay user equipment (UE) corresponding to a proximity service-enabled user equipment (ProSe-enabled UE) with a remote UE in a wireless communication system, the method comprising:

receiving from the remote UE, a direct communication request message comprising information on an inactivity timer value during a direct link setup procedure with the remote UE;

based on that there is no signaling via a direct link established with the remote UE, starting a timer with the inactivity timer value; and based on that no communication occurs until the timer expires, locally releasing the direct link established with the remote UE.

2. The method of claim 1, wherein, based on that there is a signaling message transmitted via the direct link before the timer expires, the relay UE stops the timer and configures the timer as an initial value.

3. The method of claim 1, wherein the inactivity timer value is determined based on a transmission period of a direct communication keepalive message transmitted by the remote UE, a retransmission time interval, and a maximally allowed retransmission count.

4. The method of claim 3, wherein the inactivity timer value is determined based on an equation, $$\text{'Inactivity timerkeep'} \geq \text{'transmission period of keepalive message'} + \text{'retransmission time interval'} * \text{'maximum number of allowed retransmissions'} \qquad \text{[Equation]}$$

wherein the 'Inactivity timerkeep' corresponds to a maximum inactivity period, wherein the 'transmission period of keepalive message' corresponds to a transmission period of the direct communication keepalive message, wherein the 'retransmission time interval' corresponds to a retransmission time interval of the direct communication keepalive message, and wherein the 'maximum number of allowed retransmissions' corresponds to a maximally allowed retransmission count of the direct communication keepalive message.

5. The method of claim 1, wherein the relay UE receives a direct communication keepalive message from the remote UE.

6. A relay user equipment (UE) corresponding to a proximity service-enabled user equipment (ProSe-enabled UE) performing direct communication with a remote UE in a wireless communication system, the relay UE comprising:
   a transmitter;
   a receiver; and
   a processor configured to operate in a manner of being connected with the transmitter and the receiver,
   wherein the processor:
   controls the receiver to receive, from the remote UE, a direct communication request message comprising information on an inactivity timer value during a direct link setup procedure with the remote UE,
   based on that there is no signaling via a direct link established with the remote UE, starts a timer with the inactivity timer value, and
   based on that no communication occurs until the timer expires, locally releases the direct link established with the remote UE.

7. The relay UE of claim 6, wherein, based on that there is a signaling message transmitted via the direct link before the timer expires, the relay UE stops the timer and configures the timer as an initial value.

8. The relay UE of claim 6, wherein the inactivity timer value is determined based on a transmission period of a direct communication keepalive message transmitted by the remote UE, a retransmission time interval, and a maximally allowed retransmission count.

9. The relay UE of claim 8, wherein the inactivity timer value is determined based on an equation, $$\text{'Inactivity timerkeep'} \geq \text{'transmission period of keepalive message'} + \text{'retransmission time interval'} * \text{'maximum number of allowed retransmissions'} \qquad \text{[Equation]}$$

wherein the 'Inactivity timerkeep' corresponds to a maximum inactivity period, wherein the 'transmission period of keepalive message' corresponds to a transmission period of the direct communication keepalive message, wherein the 'retransmission time interval' corresponds to a retransmission time interval of the direct communication keepalive message, and wherein the 'maximum number of allowed retransmissions' corresponds to a maximally allowed retransmission count of the direct communication keepalive message.

10. The relay UE of claim 6, wherein the relay UE receives a direct communication keepalive message from the remote UE.

\* \* \* \* \*